US012016813B2

(12) United States Patent
Patel et al.

(10) Patent No.: US 12,016,813 B2
(45) Date of Patent: Jun. 25, 2024

(54) MOTORIZED REHABILITATION DEVICE

(71) Applicant: THE UNIVERSITY OF WESTERN ONTARIO, London (CA)

(72) Inventors: Rajni V. Patel, London (CA); Vahid Mehrabi, London (CA); Seyed Farokh Atashzar, London (CA)

(73) Assignee: The University of Western Ontario, Toronto (CA)

( * ) Notice: Subject to any disclaimer, the term of this patent is extended or adjusted under 35 U.S.C. 154(b) by 856 days.

(21) Appl. No.: 16/757,342

(22) PCT Filed: Oct. 18, 2017

(86) PCT No.: PCT/CA2017/051240
§ 371 (c)(1),
(2) Date: Apr. 17, 2020

(87) PCT Pub. No.: WO2019/075543
PCT Pub. Date: Apr. 25, 2019

(65) Prior Publication Data

US 2020/0375833 A1 Dec. 3, 2020

(51) Int. Cl.
*A61H 1/02* (2006.01)
*A61H 1/00* (2006.01)

(52) U.S. Cl.
CPC .......... *A61H 1/005* (2013.01); *A61H 1/0266* (2013.01); *A61H 1/0285* (2013.01);
(Continued)

(58) Field of Classification Search
CPC .......... A61H 1/00; A61H 1/001; A61H 1/003; A61H 1/005; A61H 1/02; A61H 1/0237;
(Continued)

(56) References Cited

U.S. PATENT DOCUMENTS 4,476,949 A * 10/1984 Patton .................. A61G 5/1051
74/471 XY
4,666,362 A * 5/1987 Landsberger .......... B25J 9/0078
414/735
(Continued)

FOREIGN PATENT DOCUMENTS

BR 102014015776 2/2016
CN 101292935 10/2008
(Continued)

OTHER PUBLICATIONS

Alamdari et al. (2015) Parallel articulated-cable exercise robot (PACER): novel home-based cable-driven parallel platform robot for upper limb neuro-rehabilitation: In Proceedings of the ASME 2015 International Design Engineering Technical Conferences and Computers and Information in Engineering Conference (IDETC/CIE) vol. 5A, 39th Mechanisms and Robotics Conference. Boston, Massachusetts, USA. Aug. 2-5, 2015.
(Continued)

*Primary Examiner* — Bradley H Philips
*Assistant Examiner* — Savannah L Gabriel
(74) *Attorney, Agent, or Firm* — Knobbe, Martens, Olson & Bear, LLP

(57) ABSTRACT

A motorized rehabilitation device includes a mobile base bound by a lower surface and an upper surface. A first motorized wheel assembly is supported on the upper surface of the mobile base. The mobile base also includes a second motorized wheel assembly at least partially extending below the lower surface of the base. A dome is bound by an exterior convex surface and an interior concave surface. The dome is biased for friction contact of the interior concave surface with the first motorized wheel assembly. An end-effector is positioned above the exterior concave surface. The end-effector is configured to engage an animal body part.

21 Claims, 18 Drawing Sheets

(52) U.S. Cl.
CPC ................ *A61H 2201/0157* (2013.01); *A61H 2201/1207* (2013.01); *A61H 2201/1659* (2013.01); *A61H 2201/501* (2013.01); *A61H 2201/5064* (2013.01)

(58) Field of Classification Search
CPC .... A61H 1/024; A61H 1/0244; A61H 1/0266; A61H 1/0285; A61H 1/0274; A61H 1/0277; A61H 1/0281; A61H 2201/0157; A61H 2201/1207; A61H 2201/1659; A61H 2201/501; A61H 2201/5064; A61H 2201/018; A61H 2201/1215; A61H 2201/14; A61H 2201/1463; A61H 2201/1635; A61H 2201/164; A61H 2201/1666; A61H 2201/1673; A61H 2205/10; A61H 2205/102; A61H 2205/12; B25J 9/0006; A63B 23/08; A63B 21/152; A63B 21/154
See application file for complete search history.

(56) References Cited

U.S. PATENT DOCUMENTS

| | | | | |
|---|---|---|---|---|
| 6,331,013 | B2 * | 12/2001 | Choi | A61G 5/125 280/657 |
| 7,175,577 | B2 | 2/2007 | Greenspan et al. | |
| 7,322,904 | B2 * | 1/2008 | Takizawa | A63B 22/203 482/8 |
| 7,322,914 | B1 * | 1/2008 | Vittone | A63B 23/025 482/146 |
| 7,892,154 | B1 * | 2/2011 | Alexa | A63B 21/0083 482/79 |
| 8,269,447 | B2 | 9/2012 | Smoot et al. | |
| 8,366,591 | B2 * | 2/2013 | Patoğlu | A63B 23/08 482/79 |
| 2004/0198564 | A1 * | 10/2004 | Takizawa | A63B 22/203 482/68 |
| 2007/0282228 | A1 | 12/2007 | Einav et al. | |
| 2011/0306473 | A1 * | 12/2011 | Saglia | F16H 19/0618 482/79 |
| 2012/0053000 | A1 * | 3/2012 | Ohm | F16H 57/08 901/23 |
| 2012/0173018 | A1 * | 7/2012 | Allen | G05D 1/0248 700/245 |
| 2014/0278221 | A1 | 9/2014 | Troy et al. | |
| 2015/0051519 | A1 | 2/2015 | Morbi et al. | |
| 2015/0151196 | A1 | 6/2015 | Bucci et al. | |
| 2015/0190927 | A1 | 7/2015 | Sutherland et al. | |
| 2016/0296829 | A1 | 10/2016 | Sambeth | |

FOREIGN PATENT DOCUMENTS

| | | |
|---|---|---|
| CN | 103083156 | 5/2013 |
| CN | 106166370 | 11/2016 |
| JP | 2007-185325 | 7/2007 |
| KR | 101384305 | 4/2014 |
| WO | WO 2012/117482 A1 | 9/2012 |

OTHER PUBLICATIONS

Cimino et al. (2011) Optimal location of mouse sensors on mobile robots for position sensing: Automatica, vol. 47, No. 10, pp. 2267-2272.

Lau et al. (2012) On the task specific evaluation and optimization of cable-driven manipulators: In: Dai J., Zoppi M., Kong X. (eds) Advances in Reconfigurable Mechanisms and Robots I, Springer, London, Chapter 63, pp. 707-716.

Robinson et al. (2005) Velocity-level kinematics of the atlas spherical orienting device using omni wheels: Transactions of the Canadian Society for Mechanical Engineering, vol. 29, No. 4, pp. 691-700.

International Search Report and Written Opinion, PCT/CA2017/051240, mailed Jul. 9, 2018.

* cited by examiner

FIGURE 15
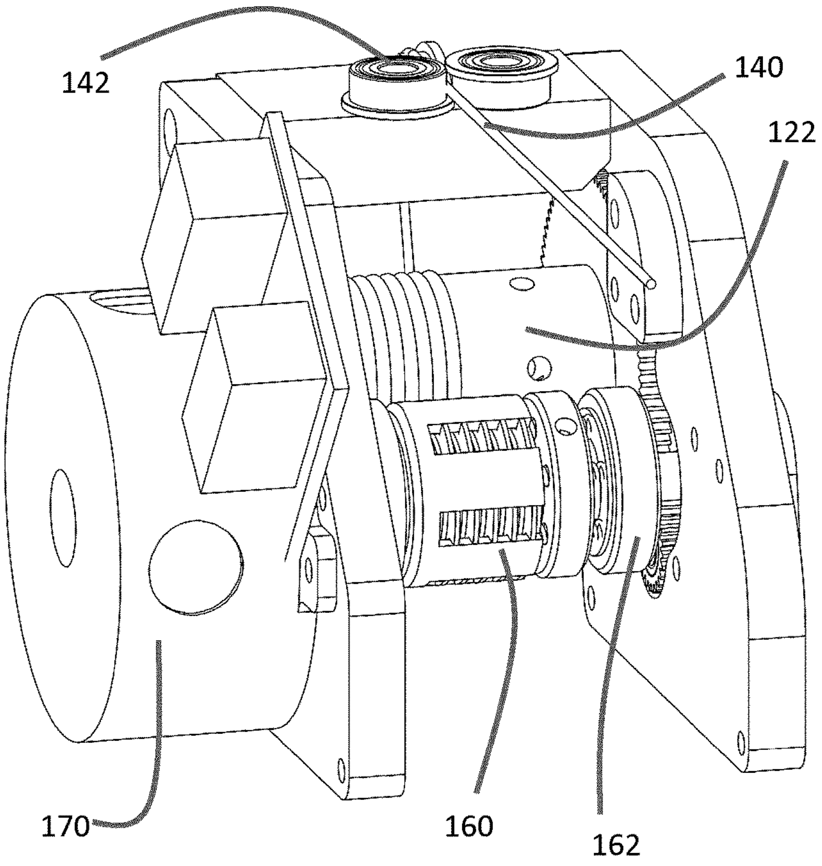
FIGURE 16A
FIGURE 16B
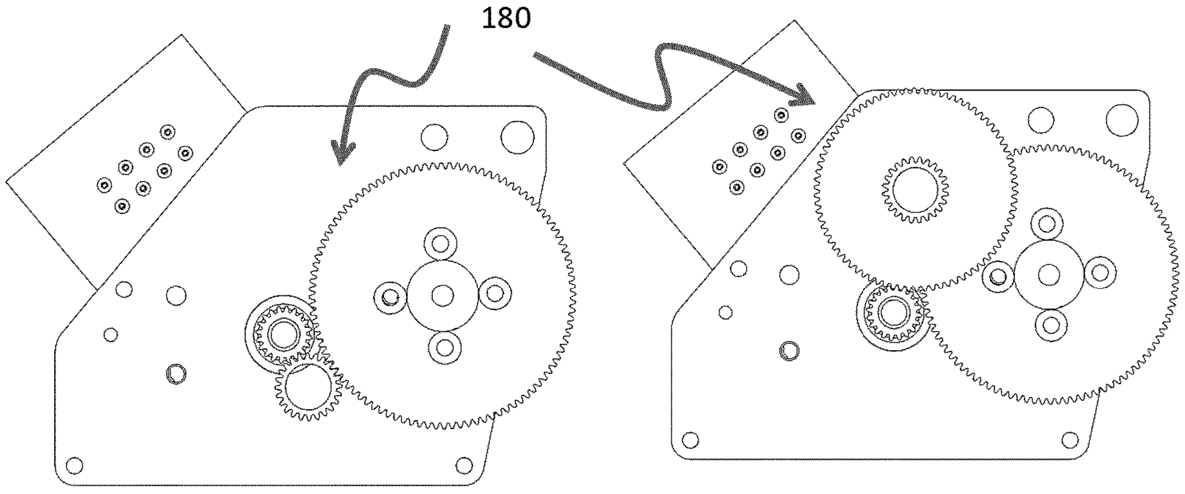

MOTORIZED REHABILITATION DEVICE

CROSS REFERENCE TO RELATED APPLICATIONS

This application is the U.S. National Phase of International Application No. PCT/CA2017/051240, filed Oct. 18, 2017, designating the U.S. and published in English as WO 2019/075543 A1 on Apr. 25, 2019.

BACKGROUND OF THE INVENTION

Field of the Invention

The present invention relates to powered movement of body parts, and more particularly to devices that provide powered movement to assist in medical rehabilitation or physical training.

Description of the Related Art

Many people suffer from disease or trauma that causes deficits in movement of body parts. Such motion deficits are often treated with physical therapy including passive and assisted range of motion exercises. Challenges associated with the current state of delivering physical therapy services include limited number of clinics, large financial and human resources needed for delivering services and associated transportation costs.

Robotic rehabilitation devices provide a functional solution to insufficient or overburdened physical therapy services benefiting both healthcare systems and people with disabilities. Robotic application in motor function training shows potential to: (a) reduce cost of rehabilitation, (b) enable home-training, self-training and remotely monitored tele-rehabilitation, and (c) enable modification for different therapy applications.

However, challenges still exist in the current state of robotic rehabilitation technologies, such as: (a) high cost of manufacture, (b) complex design, (c) larger weight and size of the mechanism, (d) portability issues, (e) difficulty in operation, and (f) need for direct supervision during operation.

Accordingly, there is a continuing need to develop alternative devices for rehabilitation technology.

SUMMARY OF THE INVENTION

In an aspect there is provided, a motorized rehabilitation device comprising:

- a base bound by a lower surface and an upper surface;
- a first motorized wheel assembly supported on the upper surface of the base;
- a dome bound by an exterior convex surface and an interior concave surface, the dome biased for friction contact of the interior concave surface with the first motorized wheel assembly; and
- an end-effector positioned above the exterior concave surface, the end-effector configured to engage an animal body part.

In another aspect there is provided, a motorized rehabilitation device comprising:

- a base bound by a lower surface and an upper surface;
- a motorized cable-winch assembly supported on the upper surface of the base;

- a central rod extending from the upper surface of the base, a rotational joint connecting the a first end of the central rod to the base; and
- an end-effector positioned at a second end of the central rod, the end-effector configured to engage an animal body part.

BRIEF DESCRIPTION OF THE DRAWINGS

FIG. 15 shows a motorized winch mechanism included in the device shown in FIG. 13.

FIG. 16 shows a dual mode transmission for the winch mechanism shown in FIG. 15.

DETAILED DESCRIPTION OF PREFERRED EMBODIMENTS

With reference to the drawings, a motorized dome-wheel rehabilitation device and a motorized cable-winch rehabilitation device will be described.

Figure 1:
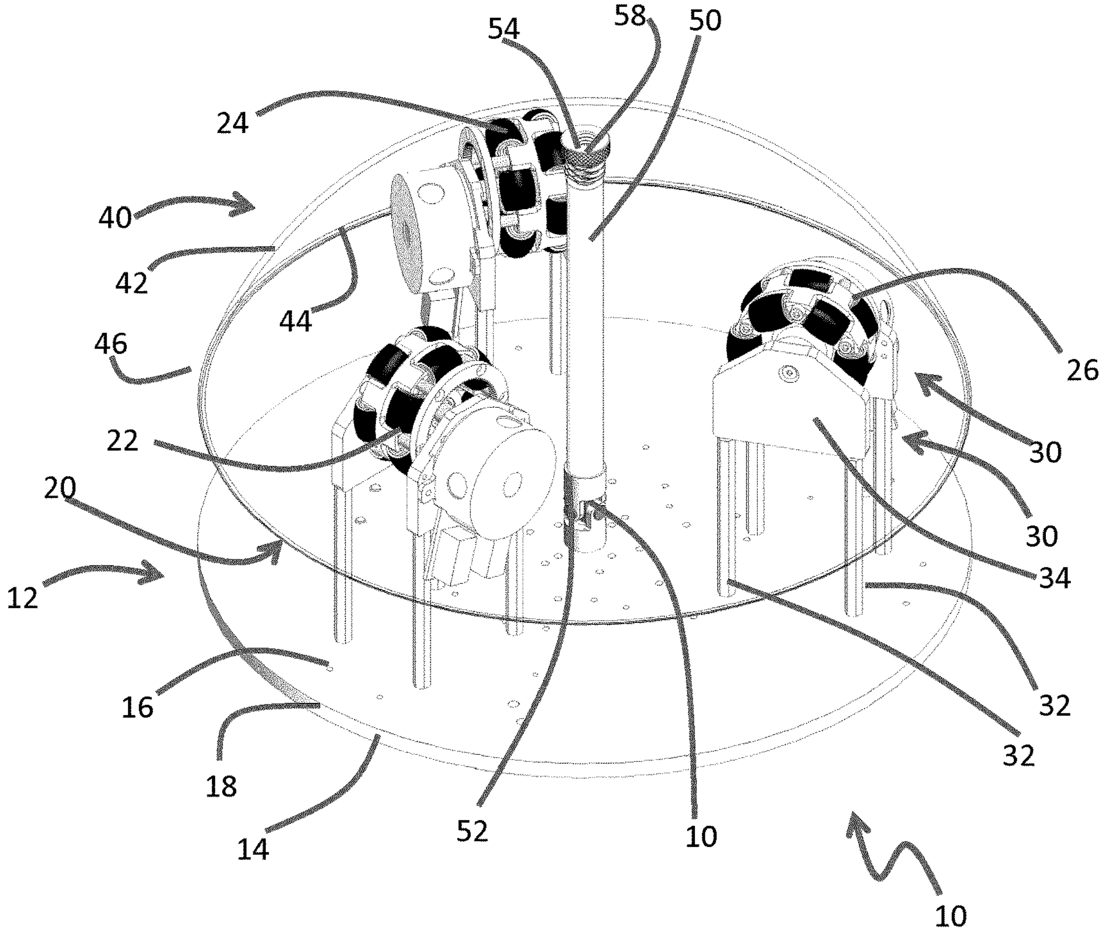
FIG. 1 shows a motorized dome-wheel rehabilitation device.

FIG. 1 shows a motorized dome-wheel rehabilitation device 10 without motors shown for ease of illustration. The dome-wheel rehabilitation device comprises a base 12 bound by a lower surface 14, an upper surface 16 and a perimeter 18. A first motorized wheel assembly 20 is supported on the upper surface 16 of the base 12. The first motorized wheel assembly 20 comprises a first omni-wheel 22, a second omni-wheel 24, and a third omni-wheel 26, with each omni-wheel mounted between a pair of parallel spaced weight-bearing wheel trusses 30 extending vertically from the upper surface 16 of the base 12. Each wheel truss 30 comprises a pair of parallel spaced vertical columns 32 having first ends connected to the upper surface 16 of the base 12 and second ends joined by a strut plate 34. Apertures and surface features formed in the strut plates 34 are used to mount each omni-wheel and its corresponding motor and transmission components (motor and transmission not shown in FIG. 1).

The first motorized wheel assembly 20 abuttingly supports a dome 40. The dome 40 is bound by an exterior convex surface 42, an interior concave surface 44, and a perimeter 46. The dome 40 is biased for friction contact of the interior concave surface with the first motorized wheel assembly 20, such that motorized motion of one or more wheels actuates motion of the dome.

The vertical height of wheel trusses 30 and the resultant height of mounted wheels is predetermined to allow a desired range of motion for the dome 40 and to provide sufficient vertical clearance of the dome 40 above the perimeter 18 of the base 12 to avoid contact of the dome 40 with the base 12 throughout the desired range of motion of the dome 40.

Control of the first motorized wheel assembly 20 is configured to maintain contact of each wheel with the interior concave surface 44 of the dome 40 throughout range of motion of the dome 40. In FIG. 1, the dome is shown in a neutral position. Co-ordinated motor actuated motion of one or more of the three omni-wheels can in turn actuate motion of the dome 40 through friction contact of the wheels with the dome 40.

Co-ordinated motion of the wheels of the first motorized wheel assembly 20 with the wheel alignment shown in FIG. 1 can provide motion of the dome of two degrees-of-freedom (DOF), a first DOF of pitch motion and a second DOF of roll motion.

The dome 40 is connected to a central rod 50, the rod having a first end 52 pivotably connected with a universal joint 56 to a central portion of the base and a second end 54 extending above the exterior convex surface of the dome. The rod 50 extending through a bore in a central portion of the dome such that its second end 54 is located above the exterior convex surface of the dome. The second end of the rod may be shaped to form a threaded portion 58 and a thumbnut fastener 59 (not shown in FIG. 1) is threadably engaged thereon to provide a tuner for adjusting bias of the dome 40 against wheels of the first motorized wheel assembly.

The dome 40 is shown as a hemispherical shell that is attached to the rod 50 using a set screw (not shown). The center of the dome is coincident with the center of the universal joint 56. As a result, the rotation of the dome that is attached to the rod occurs around the center of the universal joint. The wheels are attached to the base and are in contact with the dome at its interior surface. By driving the wheels, due to the friction in the contact points of the wheels and the dome, the dome will move. The motion of the dome results in the rotation of the rod around the center of the universal joint and consequently moving an end-effector connected to the rod. Thus, due to connection of the dome with the rod actuated motion of the dome results in corresponding motion of the rod with two DOF, a pitch motion and a roll motion.

Figure 2:
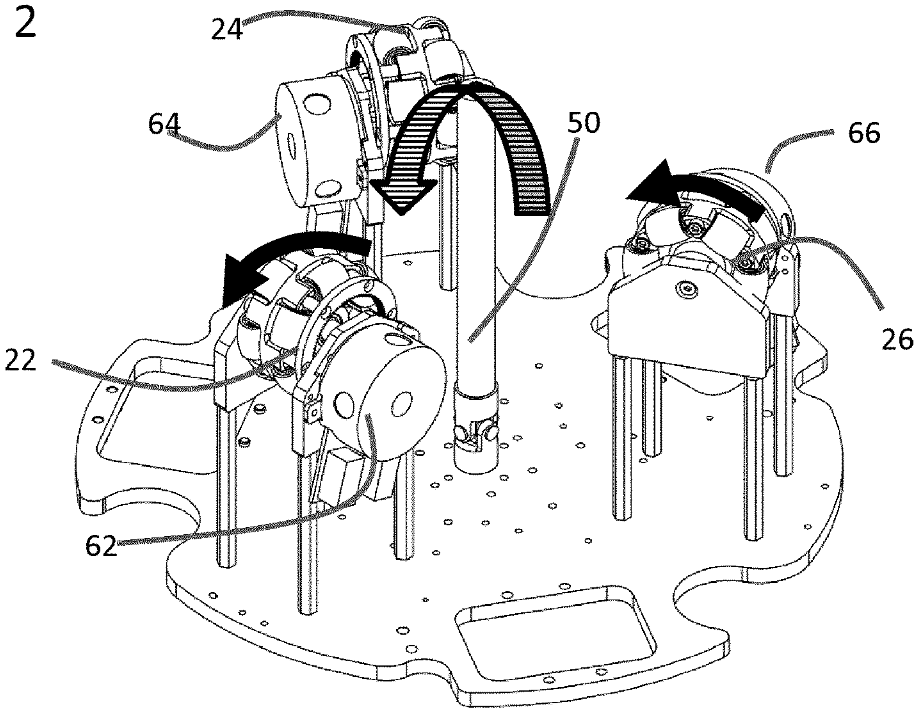
FIG. 2 depicts a pitch DOF of the device shown in FIG. 1.

An example of a coordinated action of wheels of the first motorized wheel assembly 20 to produce a first DOF of pitch motion of the dome 40 and rod 50 is provided in FIG. 2. FIG. 2 shows the motorized dome-wheel rehabilitation device 10 with a corresponding motor for each omni-wheel mounted to a strut plate 34 of a wheel truss 30. More specifically, first motor 62, second motor 64, third motor 66 are mounted on individual strut plates to be operably connected to first omni-wheel 22, second omni-wheel 24, and third omni-wheel 26, respectively. The dome 40 is not shown in FIG. 2 for ease of illustration. The pitch motion of the rod is indicated by a striped arrow, while black arrows indicate coordinated motion of wheels to actuate the pitch motion. More specifically, two of the wheels are rotating in opposite directions at the same velocity, while the third wheel is stationary, which consequently creates pitch motion in dome and the rod attached to it.

Figure 3:
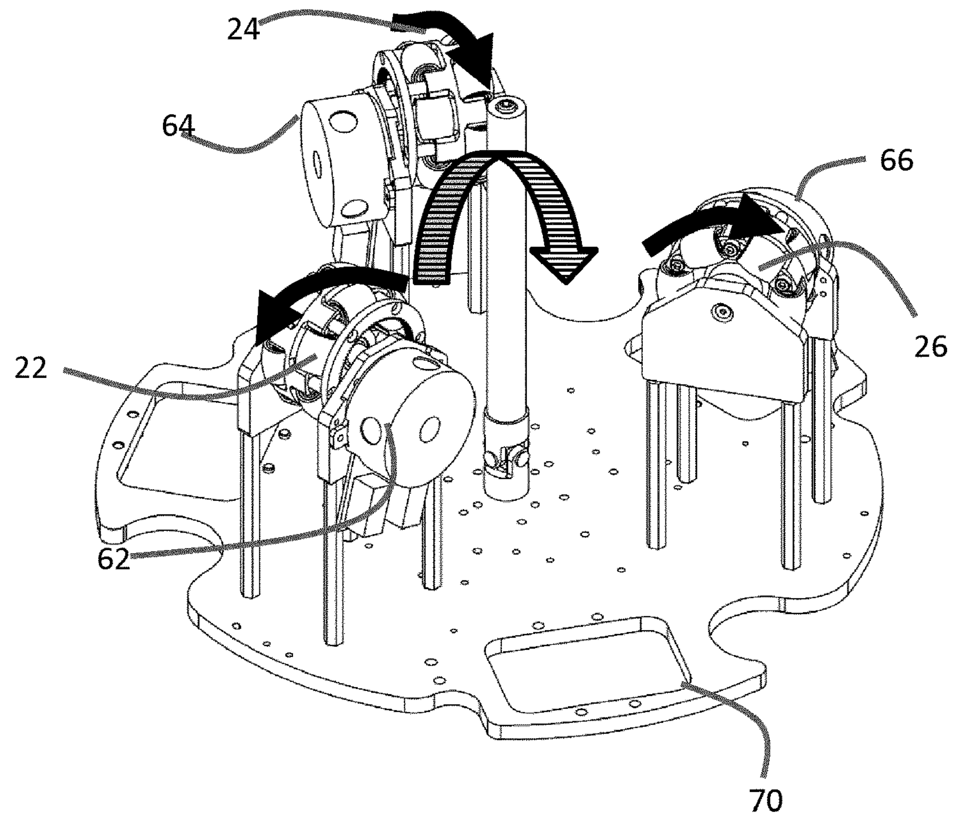
FIG. 3 depicts a roll DOF of the device shown in FIG. 1.

FIG. 3 shows an example of a coordinated action of wheels of the first motorized wheel assembly 20 to produce a second DOF of roll motion of the dome 40 and rod 50. Again, the dome 40 is not shown for ease of illustration. The roll motion of the rod is indicated by a striped arrow, while black arrows indicate coordinated motion of wheels to actuate the roll motion. More specifically, two of the wheels are rotating in the same direction at the same velocity but the third wheel is moving at lower velocity in an opposite direction, which consequently actuates roll motion of the dome and the rod attached to it.

One or both of pitch and roll motions are often involved in rehabilitation manipulations, such as passive or assisted range of motion exercises. To generate functional motions corresponding to ankle and wrist, e.g. Dorsiflexion/Plantarflexion and Inversion/Eversion motions, two rotational DOFs of pitch and roll are useful.

Figure 4:
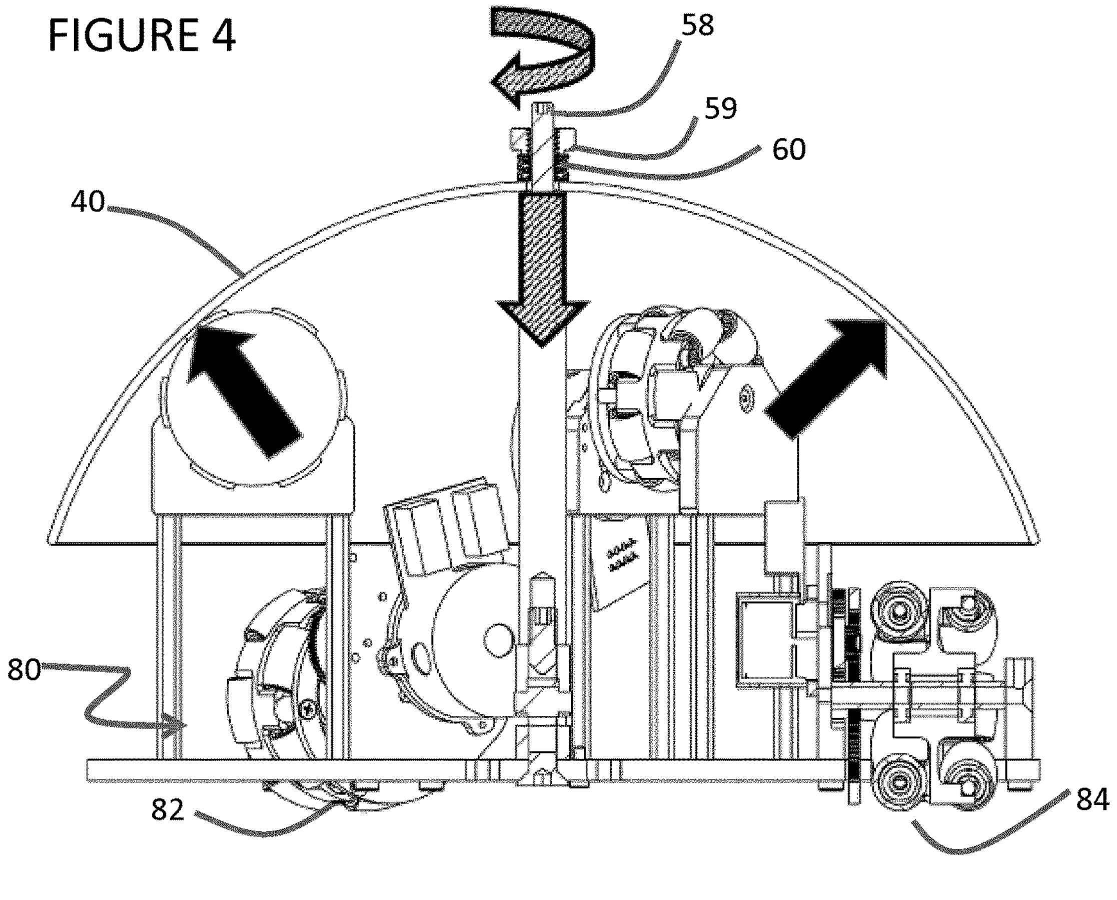
FIG. 4 shows a mechanism for adjustable force transfer to a dome in the device shown in FIG. 1.

FIG. 4 shows that the motorized dome-wheel rehabilitation device 10 can be configured to adjust the biasing force of the dome 40 against the first motorized wheel assembly 20. The dome 40 is adjustably biased by rod 50 having its first end 52 pivotably connected to a central portion of the base and its second end 54 extending above the exterior convex surface of the dome, the second end of the rod having the threaded portion 58 and the thumbnut 59 threadably engaged thereon, and a compression spring 60 coaxially coupled to the rod, the compression spring 60 having a first end contacting the exterior convex surface and a second end contacting the thumbnut. Rotation of the thumbnut translates the thumbnut 59 along the threaded portion 58, and adjusts compressive force exerted by compression spring 60 on dome 40, thereby adjusting bias of the dome 40 against the first motorized wheel assembly 20.

The adjustable bias of the dome against the first motorized wheel assembly enhances safety of the user (for example, a patient) when using the device. The device is mechanically adjustable for power transmission, making possible an adjustment of the amount of force transferred to the rod and accordingly to the user (for example, patient). As the force transferred to the dome is the result of the friction force between the wheels and the dome, there is a maximum threshold for the amount of transferable force which depends on two factors, (a) normal force between the wheels and the dome and (b) friction coefficient of the contact area. If the applied force of the wheels exceeds a particular value (maximum transferable force), the wheels will slip and the force transferred to the user will not increase. To change this value (maximum transferable force), there are two options. One is to change the coefficient of friction by changing the material of the wheels and the dome, and the second option is by changing the amount of the normal force between them. FIG. 4 demonstrates an adjustment of the normal force between the dome and the wheels. Turning the thumb-nut (striped curved arrow) consequently changes the compression force in the spring (striped straight arrow), which results in changing the normal force between the wheels and the dome (black arrows). Therefore, tightening the thumbnut changes the maximum force allowed to be applied to the user. The maximum allowable force in a rehabilitation regime may be affected by several factors, such as the state of motor deficits, the biomechanics of the patient's limb, gender, age, the place where the therapy is delivered (clinic versus home). As a result, adjustability of maximum transferred power may be a significant advantage. The device 10 allows for tuning the maximum inherent power capability, for example by simply adjusting a thumb-nut.

FIG. 4 also shows that base 12 can be a mobile platform. The base shown in FIG. 1 is a stationary platform. The base shown in FIGS. 2 and 3 is also a stationary platform, however the base is modified to include wheel wells 70. In FIG. 4, the motorized dome-wheel rehabilitation device 10 includes a second motorized wheel assembly 80 at least partially extending below the lower surface of the base 12. As shown more clearly in FIG. 5, the second motorized wheel assembly 80 comprises a fourth omni-wheel 82, a fifth omni-wheel 84, and a sixth omni-wheel 86, with each omni-wheel mounted between a pair of parallel spaced side walls 72 (only a single side wall shown for each wheel well in FIG. 5) extending above wheel wells 70, and part of each wheel extending below the lower surface of the base 12.

Figure 6:
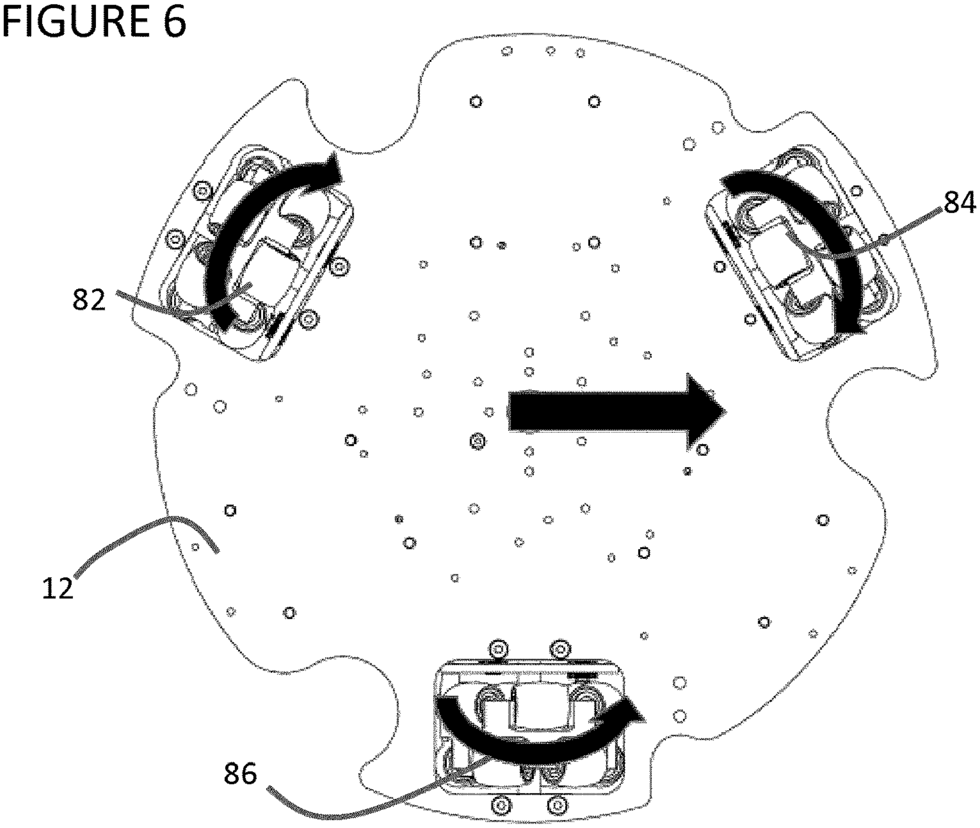
FIG. 6 depicts a first translation DOF of the mobile base shown in FIG. 5.

FIG. 6 shows an example of a coordinated action of wheels of the second motorized wheel assembly 80 to produce a first translational DOF of the base 12. Two wheels (wheels 82 and 84) are moving in the same direction at the same velocity, while a third wheel (wheel 86) moves in an opposing direction at a lower velocity.

Figure 7:
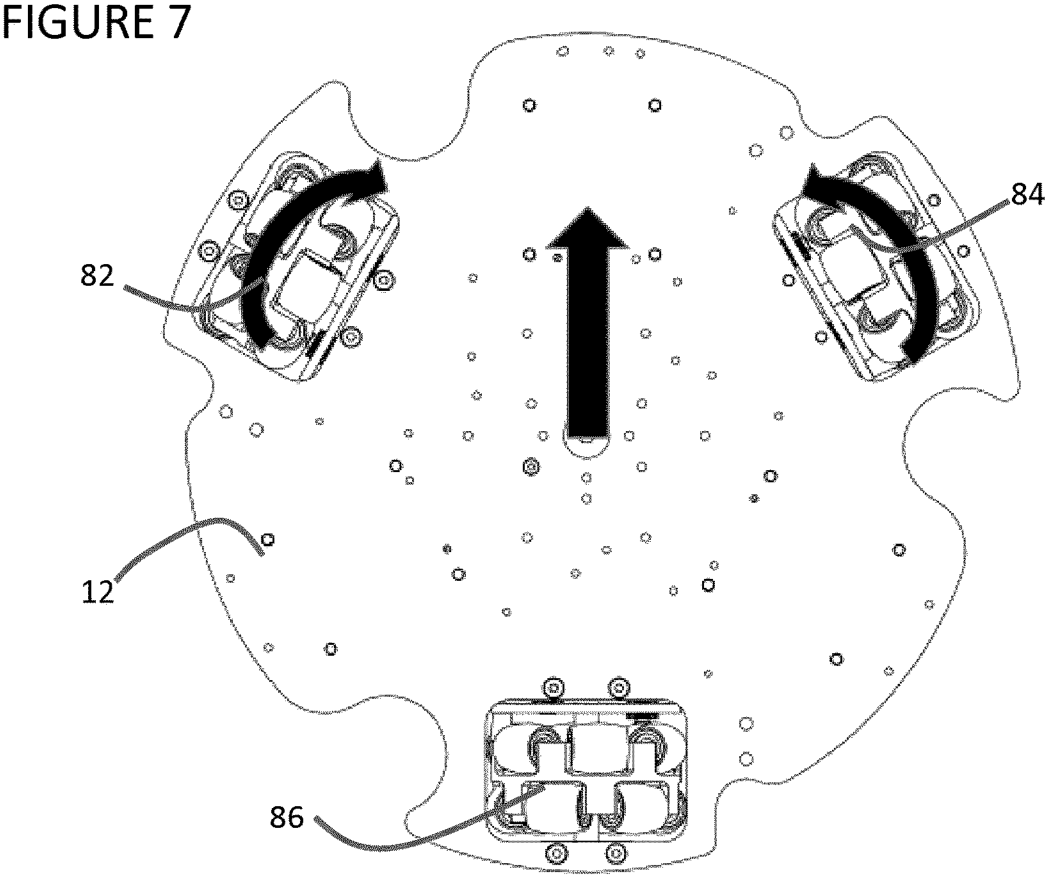
FIG. 7 depicts a second translation DOF of the mobile base shown in FIG. 5.

FIG. 7 shows an example of a coordinated action of wheels of the second motorized wheel assembly 80 to produce a second translational DOF of the base 12. Two wheels (wheels 82 and 84) are moving in opposing directions at the same velocity while the third wheel is passive.

Figure 8:
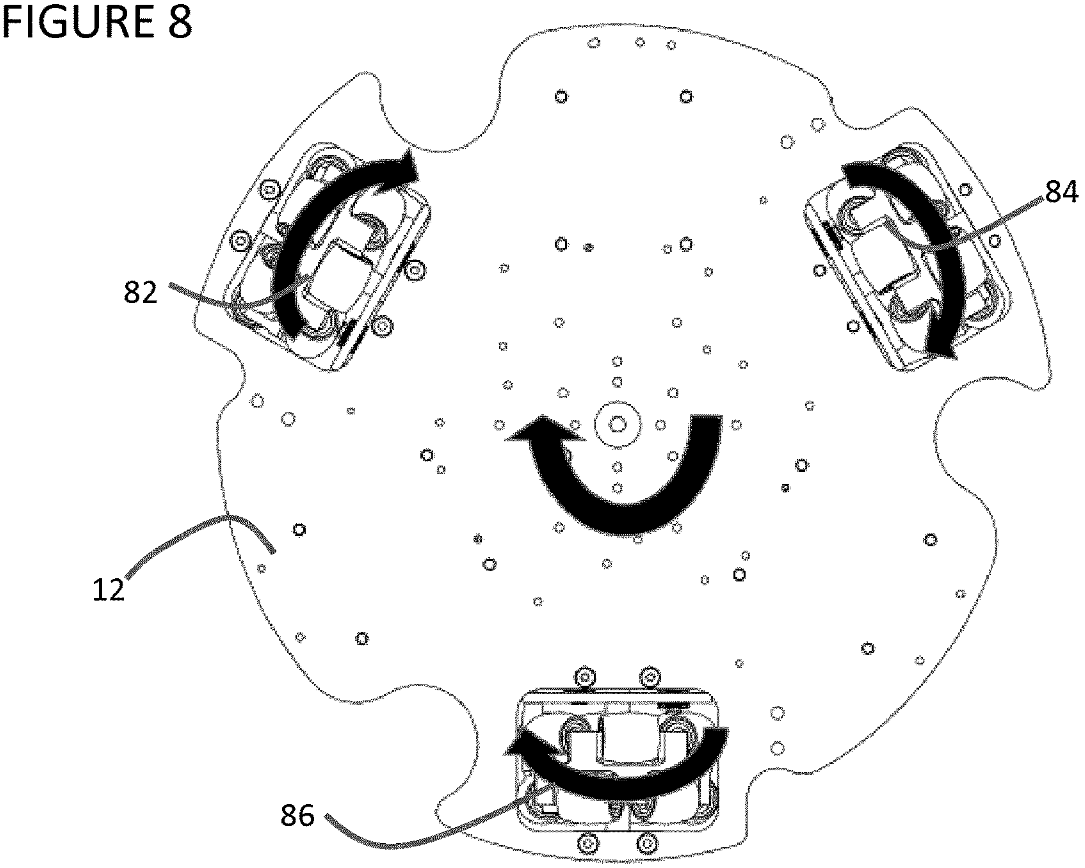
FIG. 8 depicts a yaw DOF of the mobile base shown in FIG. 5.

FIG. 8 shows an example of a coordinated action of wheels of the second motorized wheel assembly 80 to produce a yaw rotational DOF of the base 12. All three wheels are moving in the same direction at the same velocity.

FIGS. 6 to 8 taken together show the mobile platform having three-DOF omni-directional motion which provides a large workspace for translation motion. The mobile platform is capable of generating two linear DOF in the plane of a support surface, such as a mat or pad, and one rotational DOF perpendicular to that plane. Using this three DOF, the device 10 can activate knee flexion/extension and hip abduction/adduction and internal/external motion in a lower limb/extremity (LE) and elbow flexion/extension and shoulder abduction/adduction and internal/external motion in an upper limb/extremity (UE).

Figure 9:
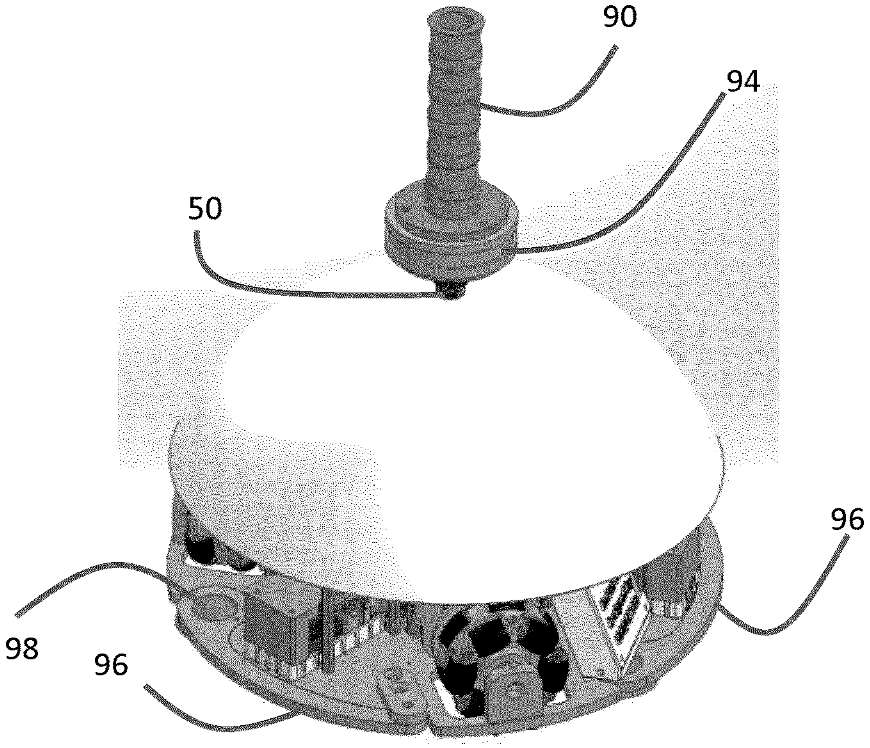
FIG. 9 shows the device in FIG. 1 with mobile base module and hand grip end-effector installed.
Figure 10:
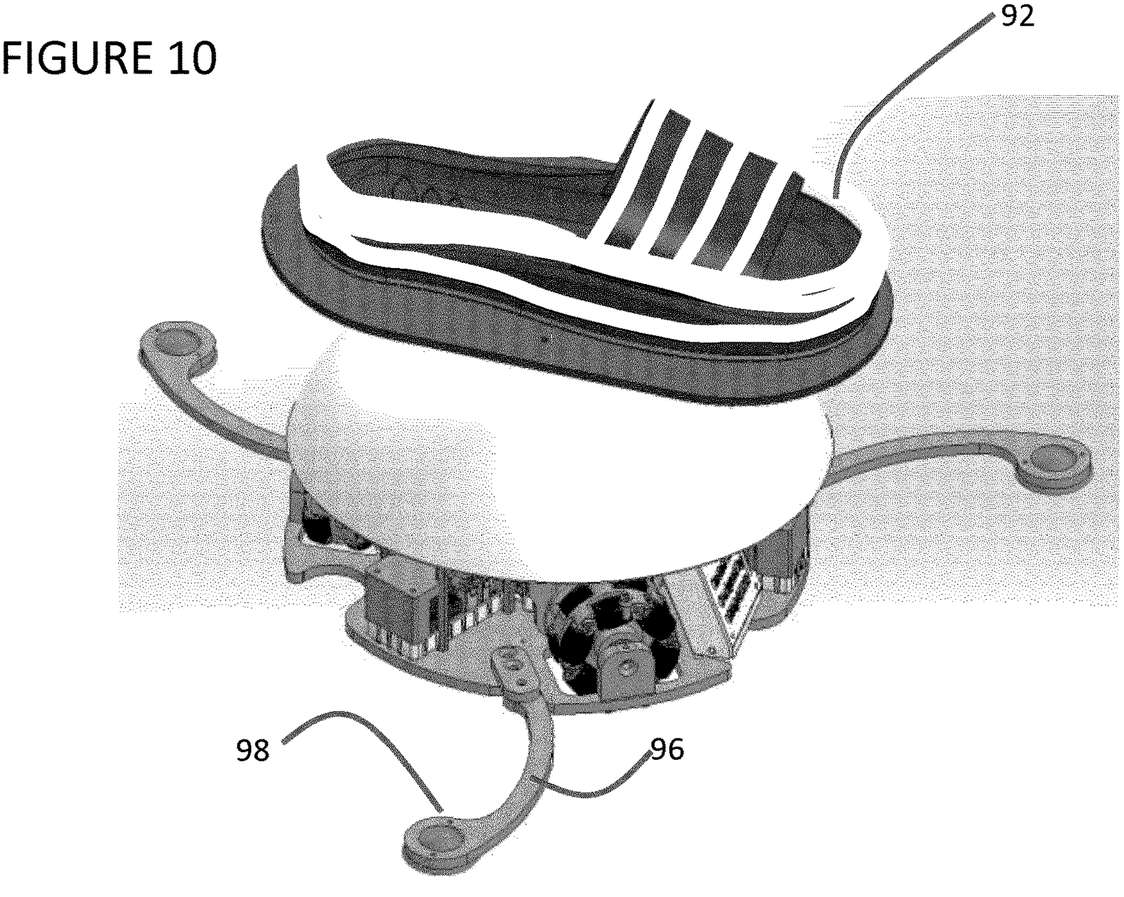
FIG. 10 shows the device in FIG. 1 with mobile base module and foot plate end-effector installed.

The motorized dome-wheel rehabilitation device 10 includes an end-effector positioned above the exterior concave surface of the dome, the end-effector configured to engage an animal body part. FIGS. 9 and 10 show an end-effector shaped as a handle 90 and a foot plate end-effector 92, respectively. The end-effector is disposed at the second end 54 of central rod 50, positioned above thumbnut 59. A force sensor may be positioned at the second end 54 with the end-effector mounted on the force sensor 94 as shown in FIG. 9. A force sensor 94 may be similarly installed under the foot-plate 92 shown in FIG. 10.

The end-effector is installed in both mobile and stationary platform variants. FIGS. 9 and 10 show a mobile platform with the second motorized wheel assembly 80 mounted on base 12. The mobile platform variant may benefit from installation of stabilizing arms. A plurality of stabilizing arms 96 pivotably coupled to the base, each stabilizing arm 96 extendable from a first position circumferentially proximal (FIG. 9) to a perimeter of the base to a second position circumferentially distal (FIG. 10) from the perimeter of the base. A spherical wheel 98, such as an eye-ball bearing, may be mounted at a free end of each of the plurality of stabilizing arms for the purpose of enduring normal force and reducing friction in contact points.

Figure 5:
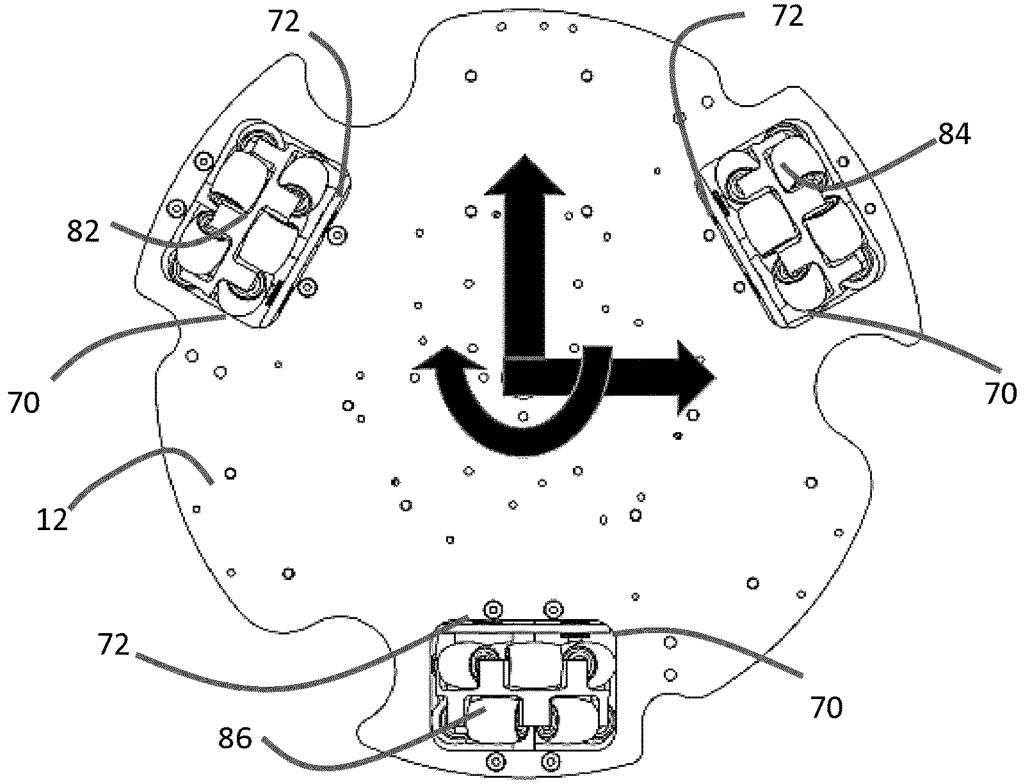
FIG. 5 shows a mobile base module that can be optionally installed in the device shown in FIG. 1.

When the device 10 includes the mobile platform in combination with the dome-wheel rotational module, the end-effector of the system can generate motions in five DOF to control the movement of the patients limb. The mobile platform driven by three omni-directional wheels, in the alignment shown in FIG. 5, provides two translational DOF in planar motion and one rotational degree-of-freedom for yaw rotation. In addition, the first motorized wheel assembly in the alignment shown in FIG. 1 can drive the dome to provide two decoupled rotational DOF that correspond to the pitch and roll rotations of the dome and rod.

Figure 11A:
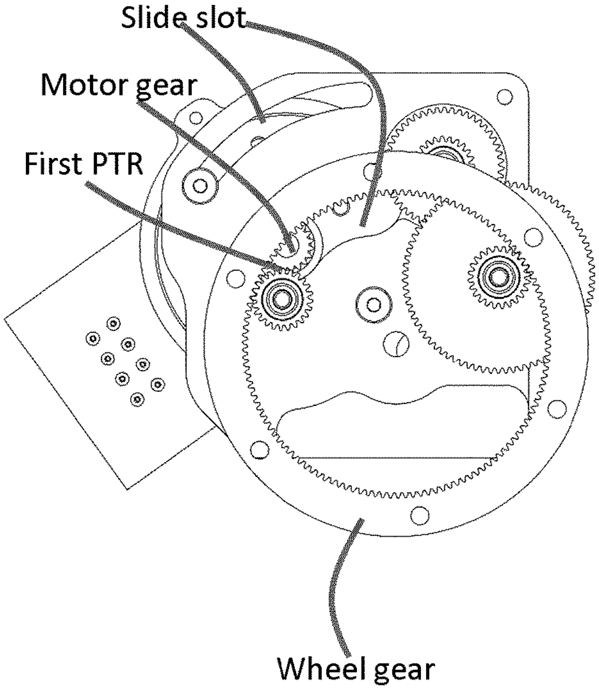
FIG. 11 shows a dual mode transmission mechanism for the mobile base module.
Figure 11B:
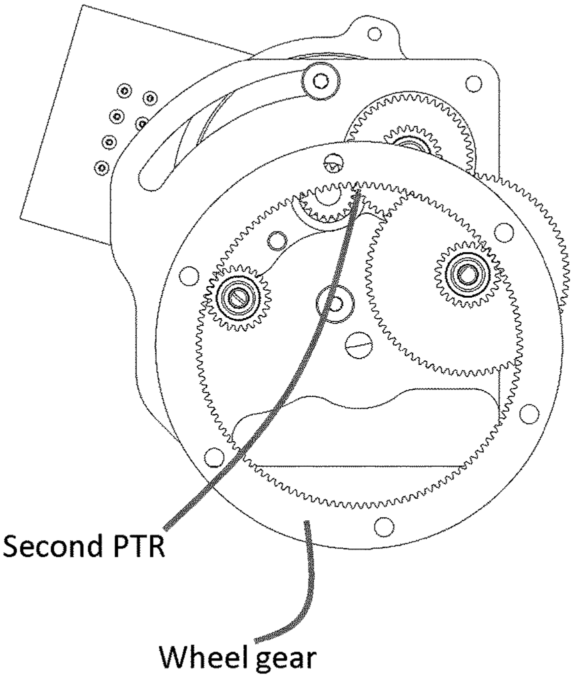

Power transmission can be performed using different mechanisms, such as gears, belts, cables and the like. In this example, to decrease the size of the structure, a set of gears is used to transmit power, reduce the rotational speed and increase the output torque of motors. The gear-set is designed to have different ratios which are adjustable between two settings, the higher one is designed and implemented for lower limb/extremity (LE) application, and the lower ratio is designed for upper limb/extremity (UE) applications. The gear ratio setting can be easily adjusted by the user with a simple mechanism that is conveniently located for manipulation, for example at the bottom of the rehabilitation device. For this purpose, the motors are attached to the power transmission with a sliding mount, for example as shown in FIG. 11. By moving the motors from one side of the slider to the other side, the pinion of the motor can be engaged with different gears and the transmission ratio can be changed as shown in FIG. 11. To move the motors and change the transmission ratio of all wheels, the three sliders are attached to cables that are connected to a turning nub at the bottom of the rehabilitation device (not shown). By turning the nub, the motors can be moved to the corresponding side of the slide. Having this novel feature, the system can represent low intrinsic mechanical impedance due to the low gear ratio for UE applications while being able to be used for high force and torque LE applications. Since patients are often weak and cannot initiate movements in the initial stages of therapy, having a low intrinsic mechanical impedance is advantageous to make sure that the patients are engaged in participating in the therapy. The dual mode sliding mount provides a first slide position to operably engage a motor with a first set of gears having a first gear ratio for low mechanical impedance for UE, and a second slide position to operably engage a motor with a second set of gears having a second gear ratio for sufficient output forces for LE applications, the second gear ratio for LE application being greater than the first gear ratio for UE application.

Figure 12A:
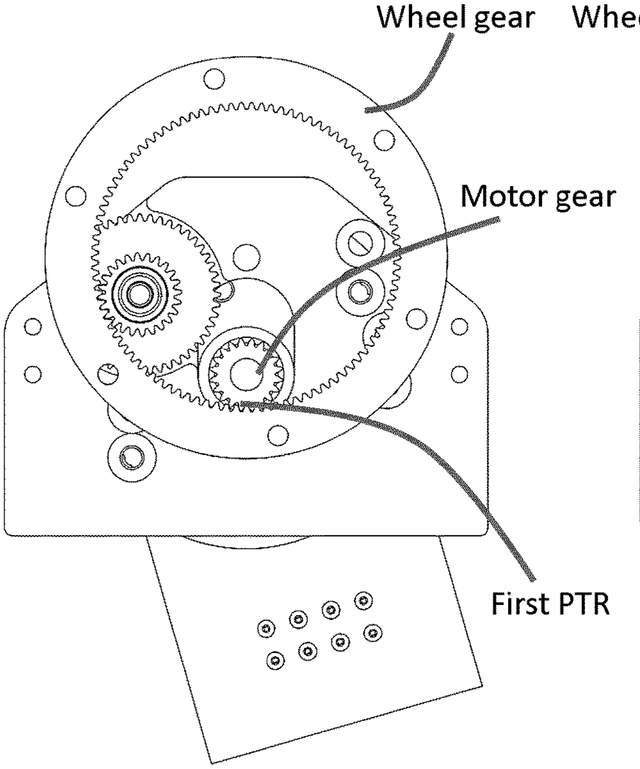
FIG. 12 shows a dual mode transmission mechanism for the dome-wheel module.
Figure 12B:
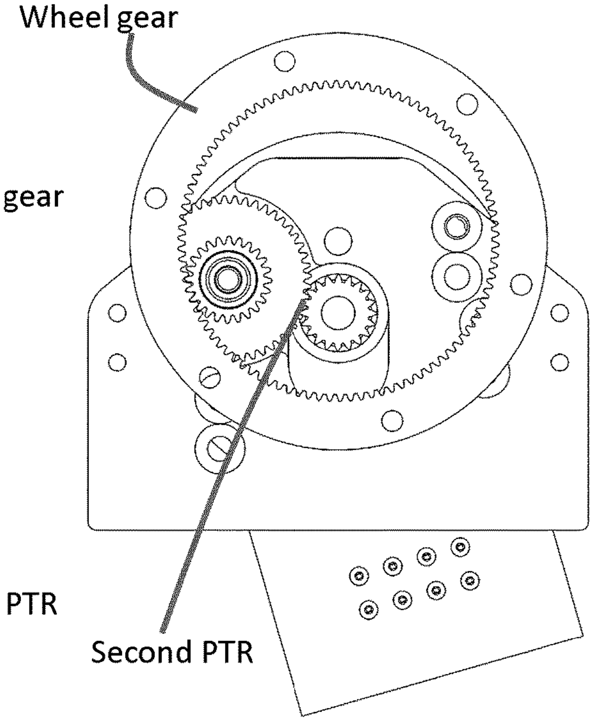

A multi-mode gear box can also be implemented for motor power transmission to the wheels of the dome-wheel module. For the dome-wheel module, the power transmission mechanism (PTM) is a two-stage gear set as shown in FIG. 12. In this PTM, the position of the motor's pinion determines the gear-set stages engaged which results in the ratio. Low ratio PTM in this case is 5:1 as shown in FIG. 12A and high ratio is 10:1 as shown in FIG. 12B. Using this PTM, the maximum achievable output torque for the implemented system is 60 Nm for the roll (X) direction and 52 Nm for the pitch (Y) direction. Similar, to the dual-mode gear box for the mobile platform, the gear box for the dome-wheel mechanism incorporates a dual mode sliding mount providing a first slide position to operably engage a motor with a first set of gears having a first gear ratio for low mechanical impedance for UE, and a second slide position to operably engage a motor with a second set of gears having a second gear ratio for sufficient output forces for LE applications, the second gear ratio for LE application being greater than the first gear ratio for UE application.

An alternative rehabilitation device that can be used to actuate two rotational DOFs of the central rod 50 substitutes the dome-wheel module with a cable driven mechanism with configurable output torque and safety features. The cable driven mechanism comprises a motor driven winch including a winch drum from which cable is wound or unwound. The terms winch drum and winch spool are used interchangeably. FIGS. 11 and 12 show a motorized cable-winch rehabilitation device 100, with the orientation of the center rod controlled by three cables attached to the rod. These cables are driven by three motors equipped with cable-winch mechanisms.

The cable-winch rehabilitation device 100 comprises a base 112 bound by a lower surface 114, an upper surface 116 and a perimeter 118. A motorized cable-winch assembly 120 is supported on the upper surface 116 of the base 112. The motorized cable-winch assembly 120 comprises a first winch drum 122, a second winch drum 124, and a third winch drum 126, with each winch drum mounted between a pair of parallel spaced weight-bearing winch trusses 130 extending vertically from the upper surface 116 of the base 112. Each winch truss 130 comprises a pair of parallel spaced vertical columns 132 having first ends connected to the upper surface 116 of the base 112 and second ends joined by a strut plate 134. Apertures and surface features formed in the strut plates 134 are used to mount each winch and its corresponding motor 170 and transmission components 180.

Cables 140 have a first end connected to each winch drum and a second end connected to central rod 150. Cable 140 is wound on to or released from each drum to impart motion to central rod 150. Cables 140 pass through a pair of horizontally mirrored guide rollers 142 and a vertical guide roller 144 mounted to the winch truss struts to align the cable 140 for winding onto or unwinding from a winch drum.

Control of the motorized cable-winch assembly 120 coordinates winding, stationary or winding of the cables from the three winch drums to control motion/orientation of the central rod 150.

Figure 13:
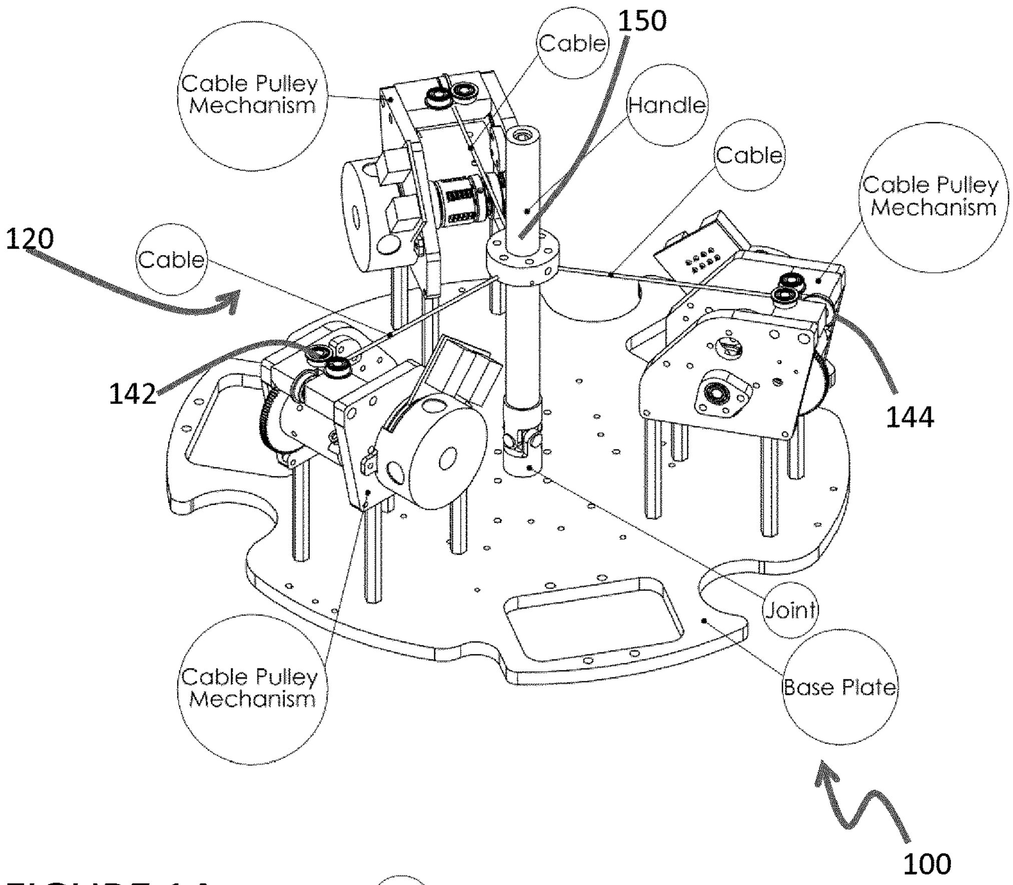
FIG. 13 shows a perspective view of a motorized cable-winch rehabilitation device.
Figure 14:
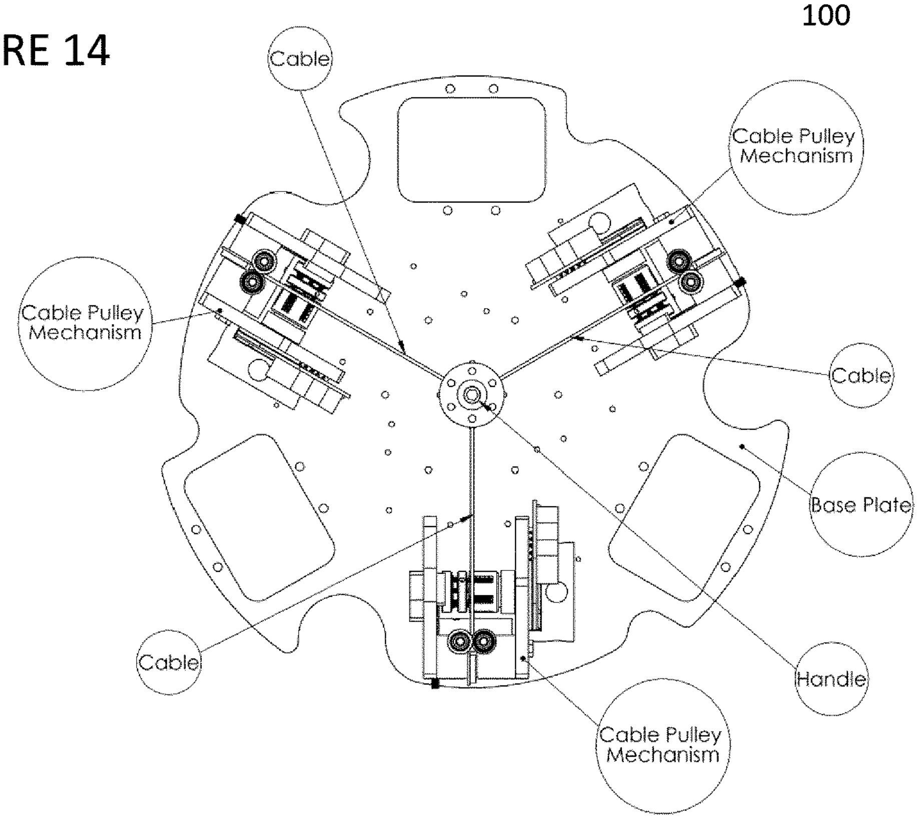
FIG. 14 shows a top view of the device shown in FIG. 13.

Co-ordinated rotation of the winch drums of the motorized cable-winch assembly 120 with the cable alignment shown in FIGS. 13 and 14 can provide motion of the central rod 150 of two degrees-of-freedom (DOF), a first DOF of pitch motion and a second DOF of roll motion.

The central rod 150 has a first end 152 pivotably connected with a universal joint 156 to a central portion of the base and a second end 154 for mounting an end-effector.

To incorporate a safety feature, a friction clutch 160 is attached between each winch drum and the motor. The friction clutch can be adjustable. By adjusting the maximum capacity of the friction clutch, the maximum amount of the force transferred to the cables can be adjusted and accordingly limited. Thus, by adjusting the slippage threshold of the clutch, the maximum force transferred from the motor to the central rod can be limited, thereby controlling the amount of force applied to the user. The clutch used to limit the output power of the motor can be chosen from any clutch such as friction, magnetic, etc.

To decrease the size and the capacity of the clutch, the clutch is located directly after the motor in PTM where the amount of the transferred torque is a minimum. In this way the capacity of the selected clutch is minimized which consequently minimizes the size of the clutch. An example of a suitable clutch is an EAO12 friction clutch by Dynatech Inc. This small clutch, as shown in FIG. 15, is an adjustable multi-plate friction-based clutch with the maximum torque capacity of 1 Nm. By twisting the thumbnut of the clutch, the compression force in the springs inside the clutch varies which changes the slippage threshold of the clutch. To have back-drivability option in case of UE and enough output torque for LE case, two PTR are provided in gear box for the cable-driven module as shown in FIG. 16. By engaging a different set of gears, PTR can increase from 5:1 to 16.25:1 as shown in FIGS. 16A and 16B, respectively.

In the cable-winch module, the cable passes through the guides and goes around the pulley which is connected to the biggest gear in the gear set shown in FIG. 16. By adjusting the clutch slippage threshold, the amount of the torque transferred to the gear is limited mechanically which consequently limits the maximum tension in the cable and the force transferred to the central rod.

Figure 17:
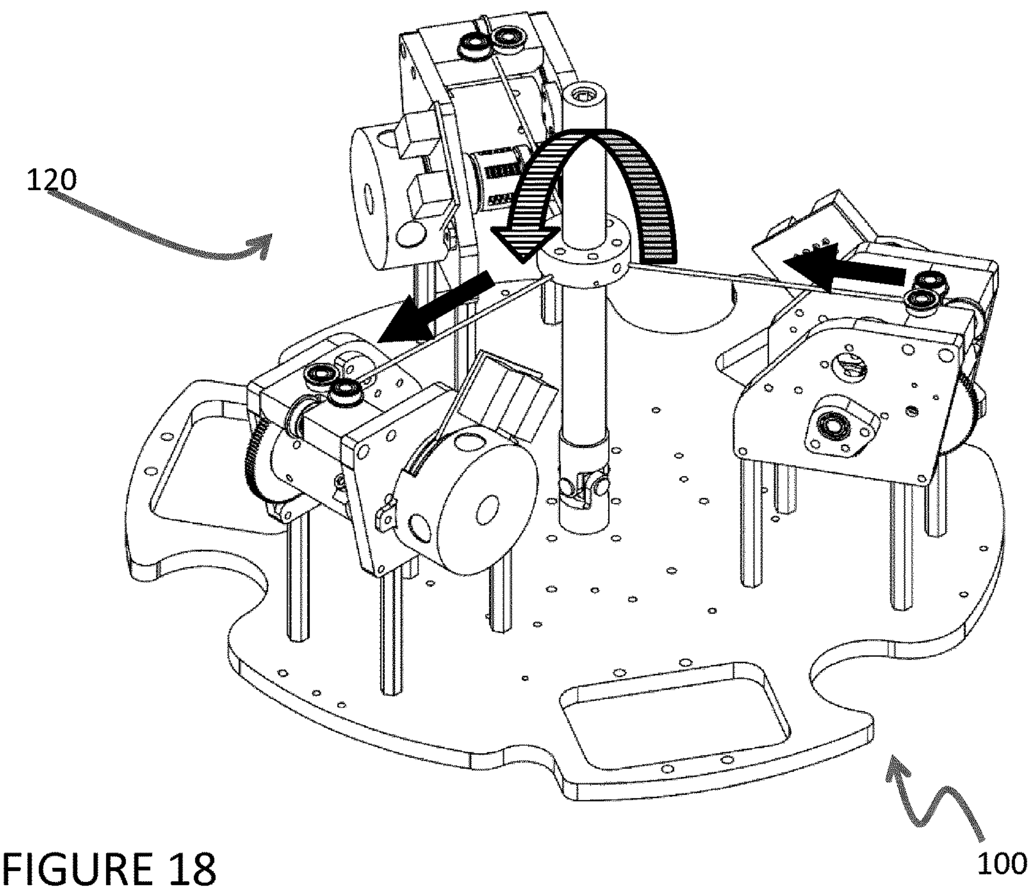
FIG. 17 depicts a pitch DOF of the device shown in FIG. 13.

An example of a coordinated action of motorized cable-winch units within the motorized cable-winch assembly 120 to produce a DOF of pitch motion of the central rod 150 is provided in FIG. 17. The pitch motion of the rod is indicated by a striped arrow, while black arrows indicate coordinated motion of motor controlled cables to actuate the pitch motion. More specifically, only one of the pulley mechanisms rotates to apply tension in its cable, while a second pulley mechanism releases the cable in the opposite direction and a third pulley mechanism keeps the length of the cable steady without moving, which consequently creates pitch motion in the central rod.

Figure 18:
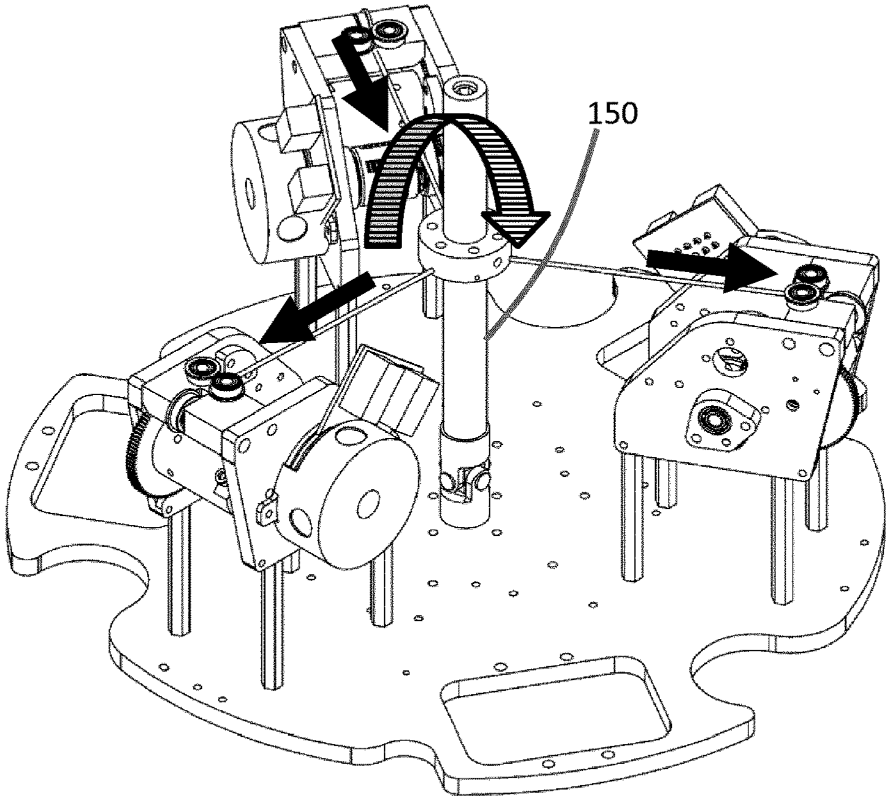
FIG. 18 depicts a roll DOF of the device shown in FIG. 13.
Figure 19:
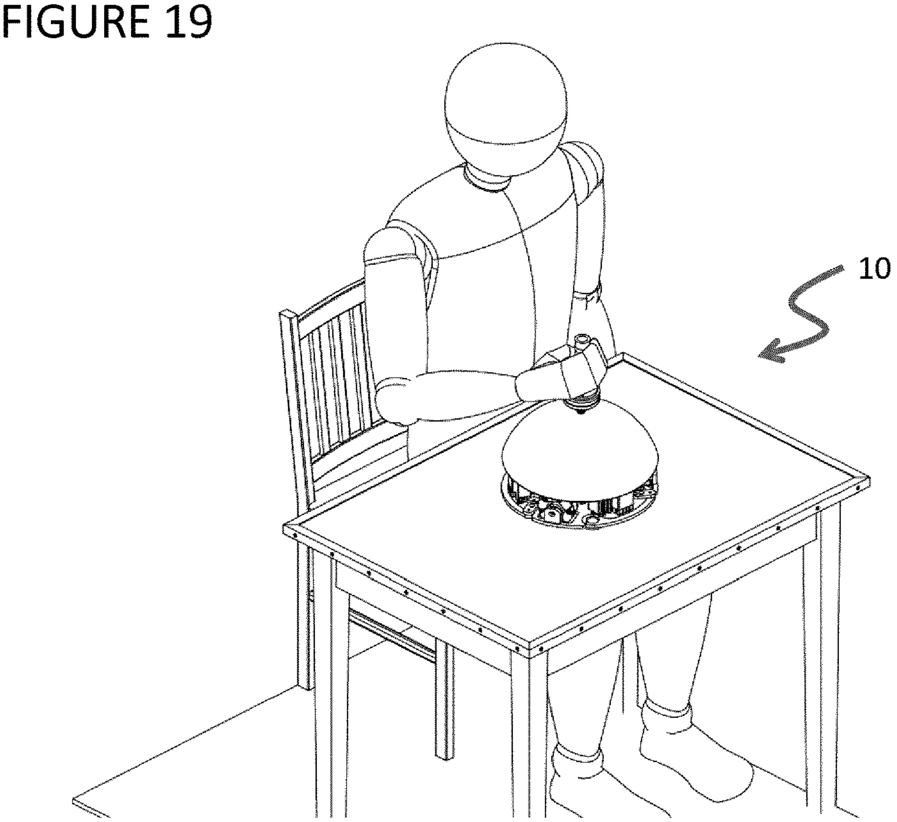
FIG. 19 shows the device shown in FIG. 9 in an operational environment.
Figure 20:
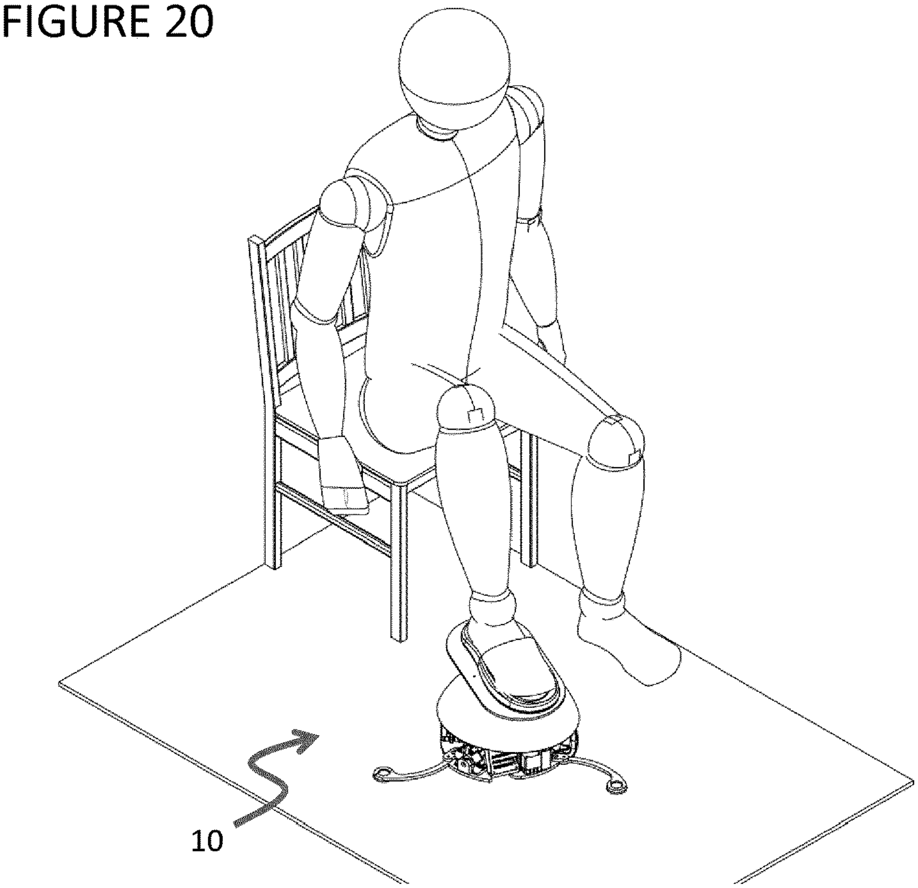
FIG. 20 shows the device shown in FIG. 9 in an operational environment.

FIG. 18 shows an example of a coordinated action of motorized cable-winch units within the motorized cable-winch assembly 120 to produce a DOF of roll motion of the central rod 150. The roll motion of the rod is indicated by a striped arrow, while black arrows indicate coordinated motion of motor controlled cables to actuate the roll motion. More specifically, two of the pulley mechanisms apply tension on their corresponding cables while the other pulley mechanism releases its cable to move in the opposite direction, which consequently creates roll motion in the central rod.

cable-winchIn operation, the rehabilitation device can be used for therapy or physical training of a user (eg., patient). Examples of operation of the rehabilitation device are shown in FIGS. 19 and 20. While the dome-wheel module on a mobile platform is shown for illustrative purposes, similar operability can be provided by combinations including the cable-winch module and the stationary platform. For the UE therapy example shown in FIG. 19, the device is equipped with a handle and is placed on a table. By attaching the patient's hand or forearm to the handle, various movement therapies can be performed on the UE. For the LE therapy example shown in FIG. 20, a small number of adjustments are made. First, the handle is replaced by a foot-plate. Second, the gear ratio in power transmission mechanism is increased to match the requirement of LE rehabilitation. Third, the stabilizer arms are extended to prevent the device from tilting. The device is placed on the ground on a pad or mat with a suitable friction coefficient. After attaching the patient's foot to the foot-plate, the rehabilitation exercises on the LE can be started.

Devices designed for UE and LE therapy require different specifications. The range of motion, accuracy in the generated motion, resistance impedance and generated output force/torque are some examples of differences for UE and LE rehabilitation.

Table 1 summarizes a list of specifications that were considered for design of UE and LE rehabilitation devices.

TABLE 1

List of desired advantages and specification for UE and LE rehabilitation device

| Type | Desired Advantages | Specification for UE | Specification for LE |
|---|---|---|---|
| Functionality | Range of applied force/torque | 40 N for planar motion at the end-effector | 40 Nm for ankle training therapy 400 N for translation force |
| | Range of motion for Inversion/eversion | ±30° | ±30° |
| | Positioning and velocity accuracy | 1 deg for pitch/roll orientation and 1 deg/sec for angular | 1 deg for pitch/roll orientation and 1 deg/sec for angular speed |
| | Low static and rolling intrinsic impedance | Maximum rotational resistance of 0.5 Nm Maximum translation resistance of 2 N | No specification |
| | Low inertia of moving parts | Maximum equivalent moving mass of 5 Kg | equivalent mass as low as possible |
| Safety | Restraining the amount of applied torque to patient | Mechanically and electrically controlling the generated force | |
| | Preventing pinching and sticking of patients body | Enclosing all the moving parts inside the device | |
| Cost | minimizing the cost | Lowest possible cost for in-home end-user under $20k | |

In operation of rehabilitation devices 10 and 100 as shown for example in FIGS. 19 and 20, observed advantages include one or more of: (a) adequate range of torques and motions, (b) low friction, (c) low impedance for back-drivability and (d) low overall mass. Specification values considered for each advantage are interpreted in context of existing devices found in the literature. For example, in the inversion/eversion direction, a desired torque for ankle rehabilitation is 40 Nm and a desired range of motion is +30o.

During operation, safety considerations are met by limiting the amount of force applied by the device to a patient. This has been done in the literature through software limits. However, relying only on a software-based safety feature for inherently powerful systems can be problematic if the software fails to detect a faulty event or if the sensory system fails to report an unsafe event to the software. The alternative approach incorporated in devices 10 and 100, for example, implement an inherently safe mechanical mechanism that can be adjusted to tune the maximum amount of force allowed to be transferred to the patient's limb. This provides a novel and safe mechanical design for UE and LE rehabilitation devices. Further advantages include simplicity in structure design and actuator type, a wide range of motion (workspace) and its capability for the multi-purpose application.

An illustrative version and several variants of a rehabilitation device have been described above without any intended loss of generality. Further examples of modifications and variation are contemplated.

For example, the dome shape need not be limited to a hemispherical shell, and maybe any convenient shape suited to an application, including for example ellipsoid, pyramidal such as a plateaued pyramid, or any functional geodesic shape.

Any convenient type of wheel may be incorporated within the device in view of one or more consideration including, for example, decreasing the overall size of the device, providing smooth motion, reducing friction, enhancing strength of the components, and reducing weight. The size of wheels may be optimized based on the internal spur gear attached to them (or other convenient power transmission) and the maximum desired strength. While omni-wheels are shown in the drawings, other omni-directional wheels such as Mecanum (or Ilon) wheels may be incorporated as suited to a particular application. Additionally, the omni-wheels shown in the drawings are a double row so the contact point of the wheels and mat stays like a perfect circle. Having this feature, the mobile platform exhibits reduced wobble (up and down) while moving which consequently makes the motion smooth or less noisy. Although, double row omni-wheels are shown, other types of omni-wheels such as single row omni-wheels or triple row omni-wheels may readily be incorporated.

While the wheels are shown in symmetric alignment relative to the base, it should be noted that asymmetric alignments are readily feasible. For example, in the dome-wheel module, 3 wheels are shown in co-planar alignment parallel to the base. However, the rehabilitation device can accommodate wheel sets that are not co-planar, and if co-planar need not be constrained to being parallel to the base. Asymmetric alignment is readily feasible for actuators in the dome-wheel module, the cable-winch module, and/or the mobile base module. For the mobile base module co-planar alignment of wheels is typical. However, symmetrical alignment is optional and asymmetrical alignments can be operable.

Three actuators are shown in both the dome-wheel module and the cable-winch module. The number of actuators is not limited to 3 and numbers of actuators greater than 3 can readily be incorporated. Additionally, in certain applications less than 3 actuators may be used. For example, in applications where limited functionality and range of motion is acceptable, the rehabilitation device may be operable with two actuators or perhaps even a single actuator, for example when a single DOF of the dome-wheel module or the cable-winch module is considered acceptable.

Figure 21:
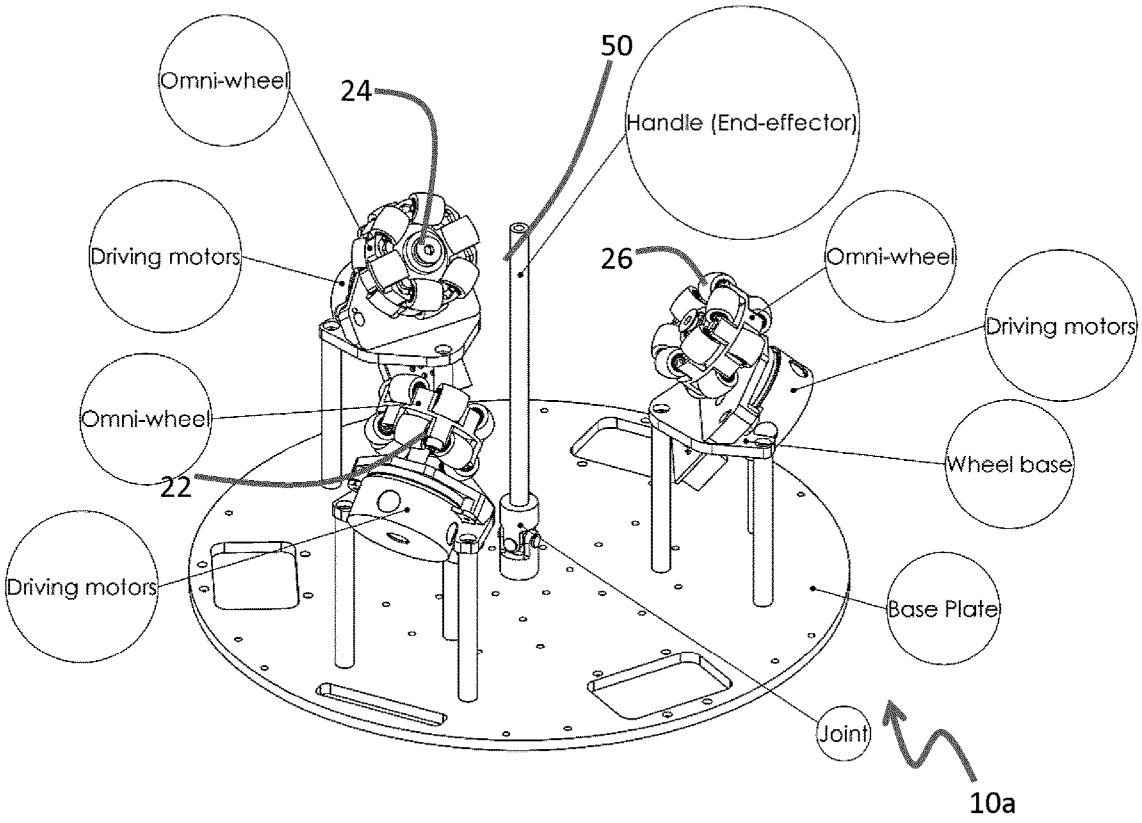
FIG. 21 shows a variant of the device shown in FIG. 1.

Varying the number of actuators or the alignment of actuators can yield advantageous combinations. For example, as shown in FIG. 21 varying the alignment of wheels so as to deviate from the vertical alignment to the base shown in FIG. 1 can allow the first motorized wheel assembly to produce 3 DOF. The vertical alignment of wheels relative to the base as shown in FIG. 1 provides a circular cross-section of each wheel that aligns with the longitudinal axis of the rod when the central rod is in its neutral perpendicular orientation relative to the base, such that the central circle cross-section of each wheel is substantially co-planar with the longitudinal axis. Alignments of the three wheel set to deviate the central circular cross-section of each while from co-planar alignment with the longitudinal axis of the central rod in its neutral perpendicular orientation provide for 3 DOF of motion. FIG. 21 is one example of such an alignment. The variant alignment rehabilitation device 10*a* includes a central rod hinged 50 to the base plate to have three rotation DOFs (roll, pitch and yaw). By applying coordinated motion (driving the motors) to each one of the wheel, as the wheels are in contact with the dome (not shown), the dome will move to a desired direction. As the dome (not shown) is attached to the central rod, the dome motion consequently moves the rod connected to it.

Figure 22:
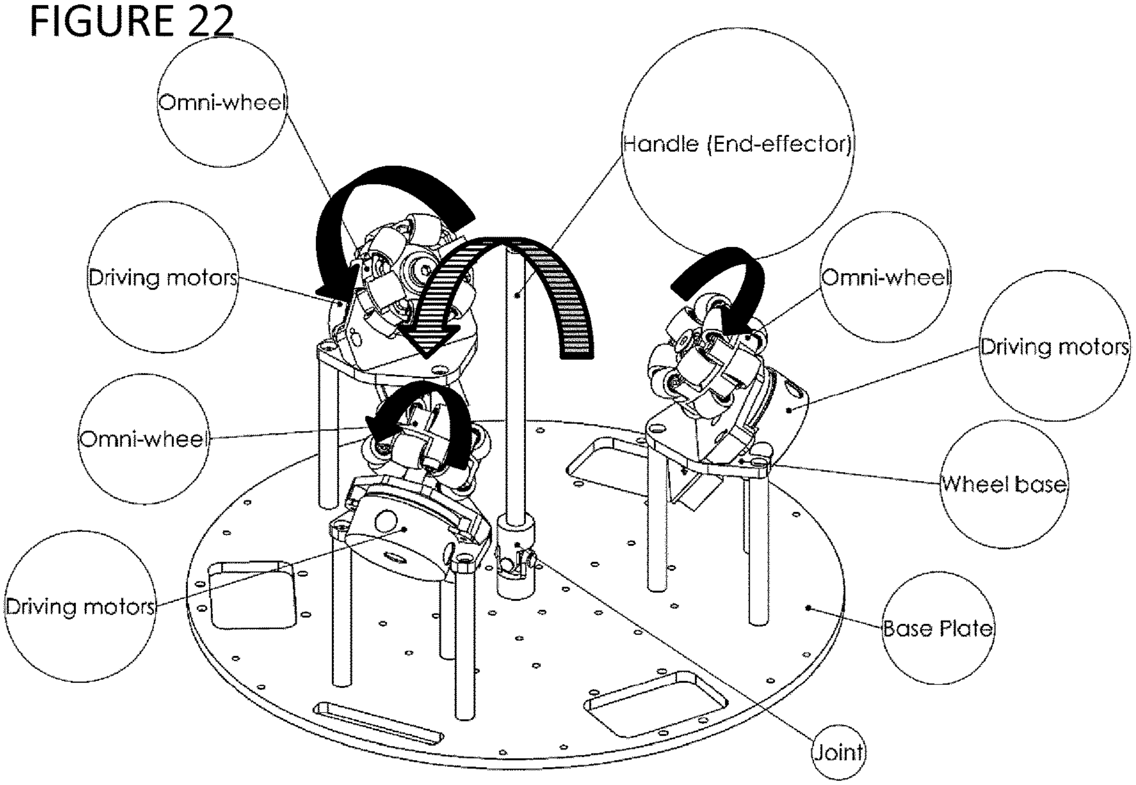
FIG. 22 depicts a pitch DOF of the device shown in FIG. 21.

An example of a coordinated action of motorized wheel units within the variant alignment of the first motorized wheel assembly to produce a DOF of pitch motion of the central rod 50 is provided in FIG. 22. The pitch motion of the rod is indicated by a striped arrow, while black arrows indicate coordinated motion of motor controlled wheels to actuate the pitch motion. More specifically, two of the wheels are rotating in the same directions at the same velocity but the third wheel is rotating at a higher velocity with respect to others in the opposite direction, which consequently creates pitch motion in the dome and the central rod.

Figure 23:
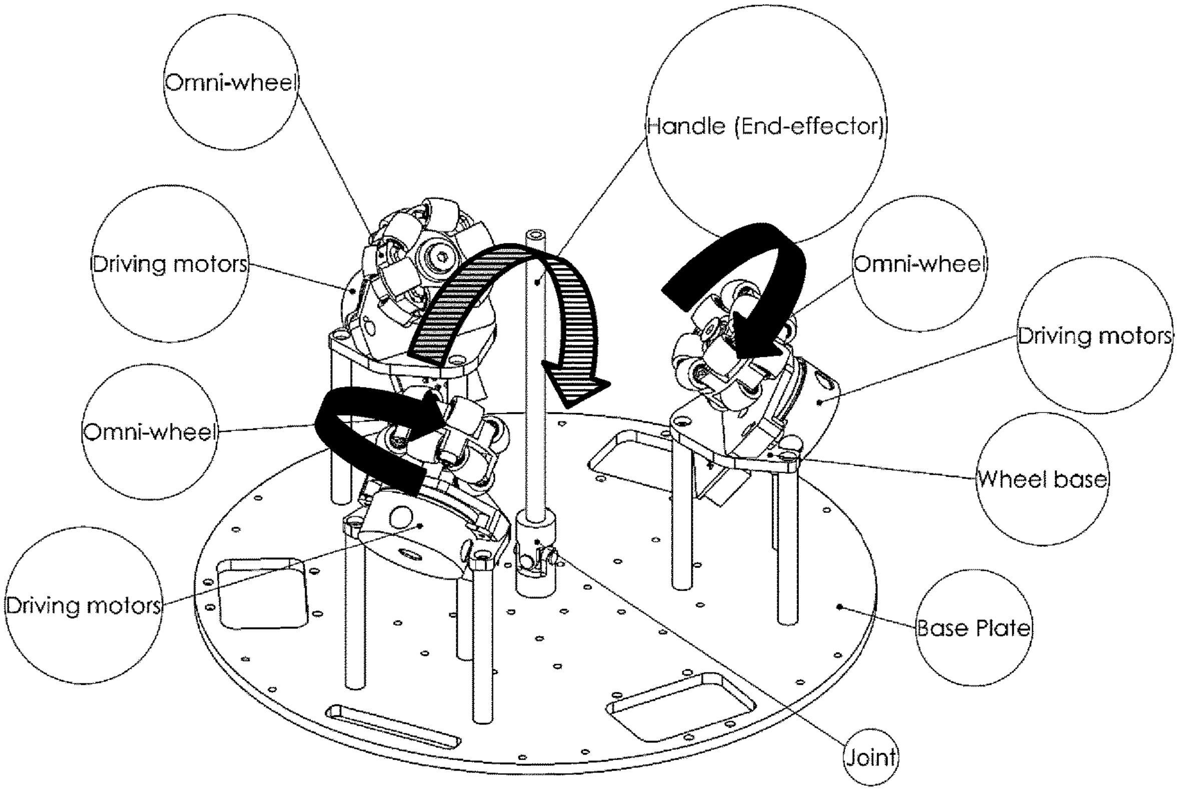
FIG. 23 depicts a roll DOF of the device shown in FIG. 21.

FIG. 23 shows an example of a coordinated action of motorized wheel units within the variant alignment of the first motorized wheel assembly to produce a DOF of roll motion of the central rod 50. The roll motion of the rod is indicated by a striped arrow, while black arrows indicate coordinated motion of motor controlled wheels to actuate the roll motion. More specifically, two of the wheels are rotating in opposite directions at the same velocity while the third wheel is stationary (passive), which consequently creates roll motion in dome and the central rod.

Figure 24:
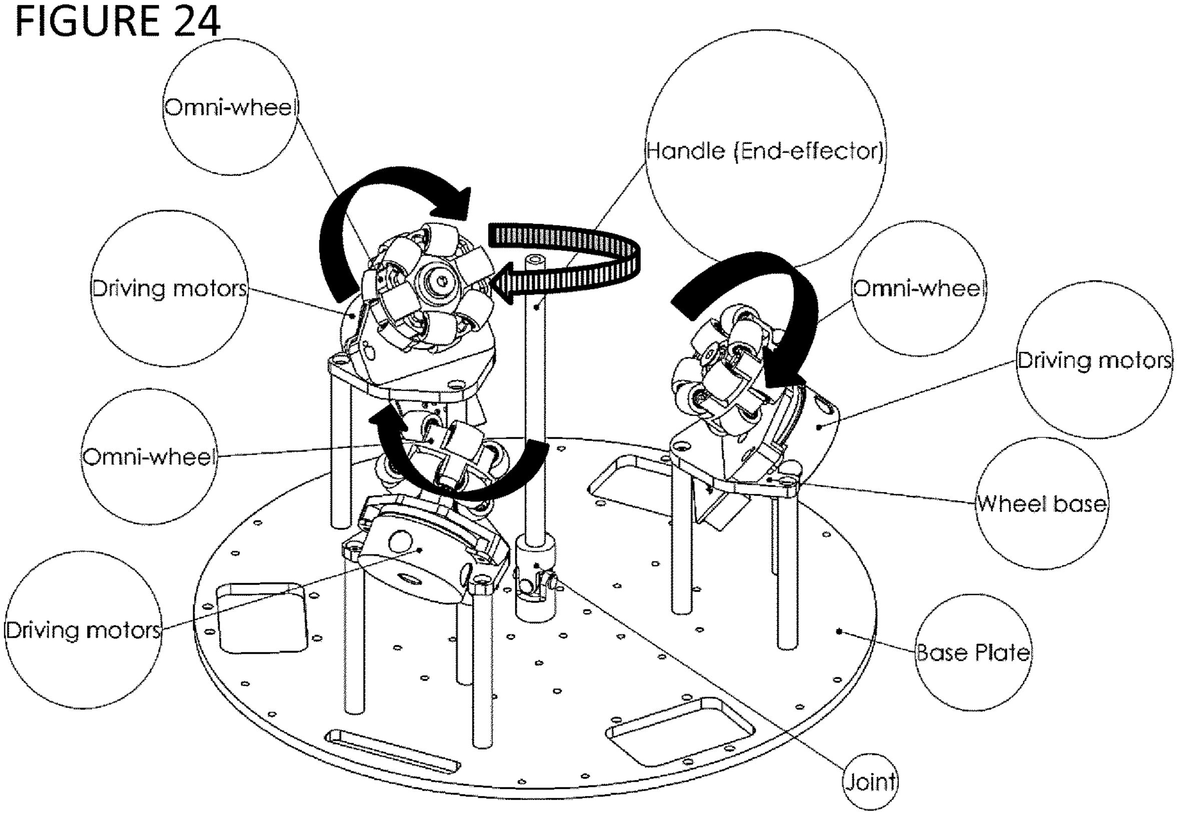
FIG. 24 depicts a yaw DOF of the device shown in FIG. 21.

FIG. 24 shows an example of a coordinated action of motorized wheel units within the variant alignment of the first motorized wheel assembly to produce a DOF of yaw motion of the central rod 50. The yaw motion of the rod is indicated by a striped arrow, while black arrows indicate coordinated motion of motor controlled wheels to actuate the yaw motion. More specifically, all of the wheels are rotating in same direction at the same velocity which consequently creates yaw motion in dome and the central rod.

Figure 25:
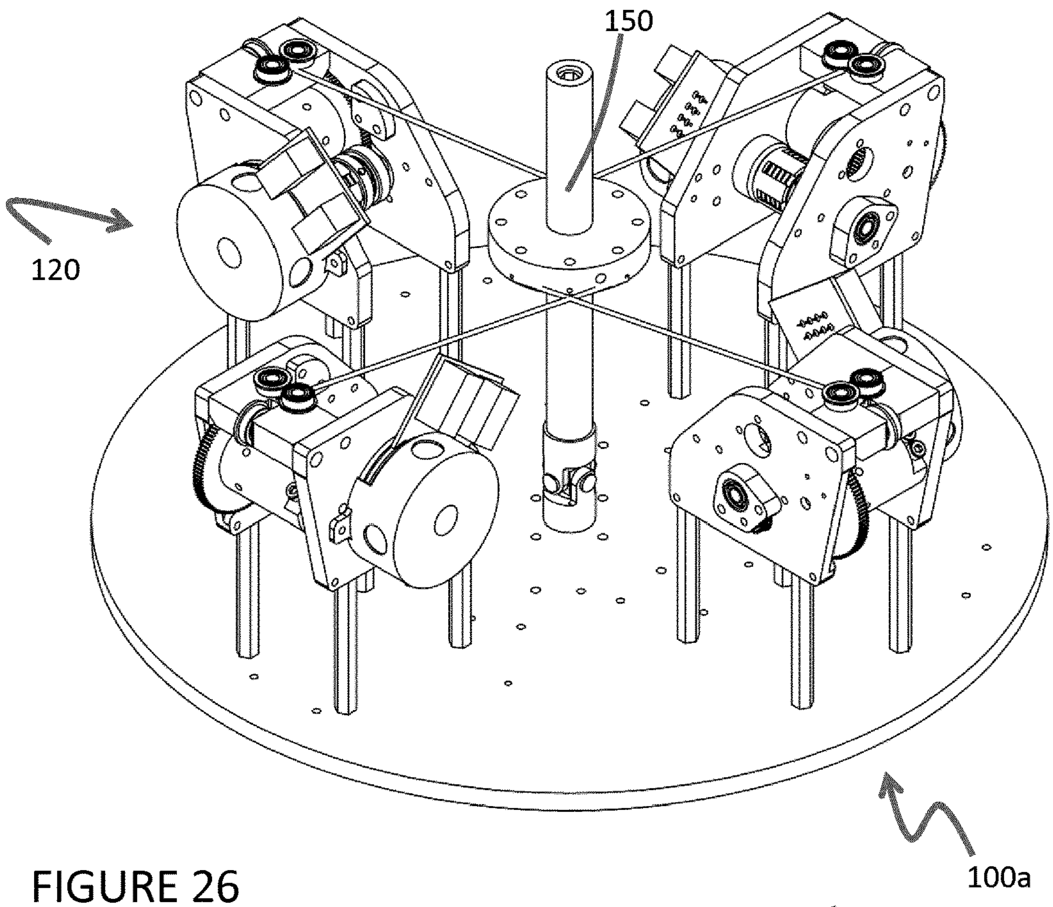
FIG. 25 shows a variant of the device shown in FIG. 13.
Figure 26:
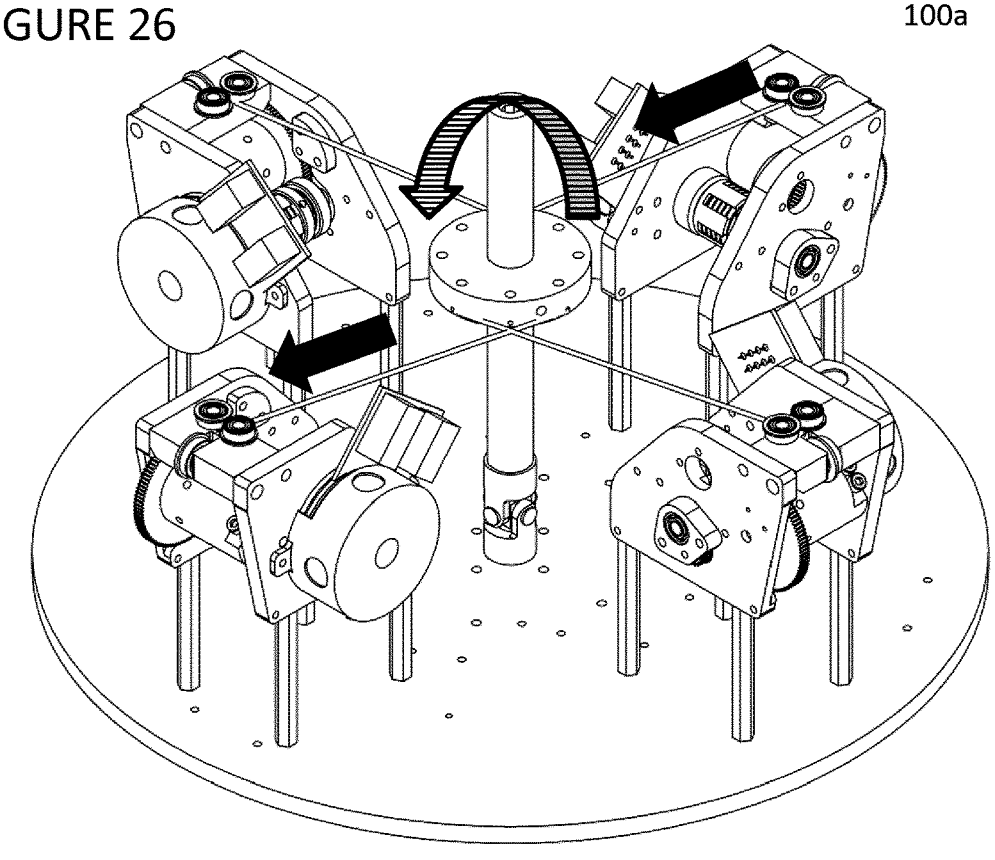
FIG. 26 depicts a pitch DOF of the device shown in FIG. 25.

FIG. 25 shows another example of varying the number of actuators or the alignment of actuators to yield an advantageous combination. Four motorized cable-winch units are supported on the base and instead of the cable attachment with the central rod being substantially perpendicular as shown in FIG. 14, each attachment of cable and central rod is offset from perpendicularity. The variant alignment rehabilitation device 100*a* includes a central rod hinged to the base plate to have three rotation DOFs (roll, pitch and yaw). By applying tension in the cables using the winch mechanisms, the central rod moves in the desired direction. The alignment shown in FIG. 25 can generate three DOFs motion related to roll, pitch and yaw An example of a coordinated action of motorized cable-winch units within the variant alignment of the motorized cable-winch assembly 120 to produce a DOF of pitch motion of the central rod 150 is provided in FIG. 26. The pitch motion of the rod is indicated by a striped arrow, while black arrows indicate coordinated motion of motor controlled cables to actuate the pitch motion. More specifically, only one of the winch mechanisms rotates to apply tension in the cable while a second winch mechanism generally diametrically opposite releases cable, while the third and fourth mechanisms (generally diametrically opposed to each other) keep the length of their cables steady without moving, which consequently creates pitch motion in the central rod.

Figure 27:
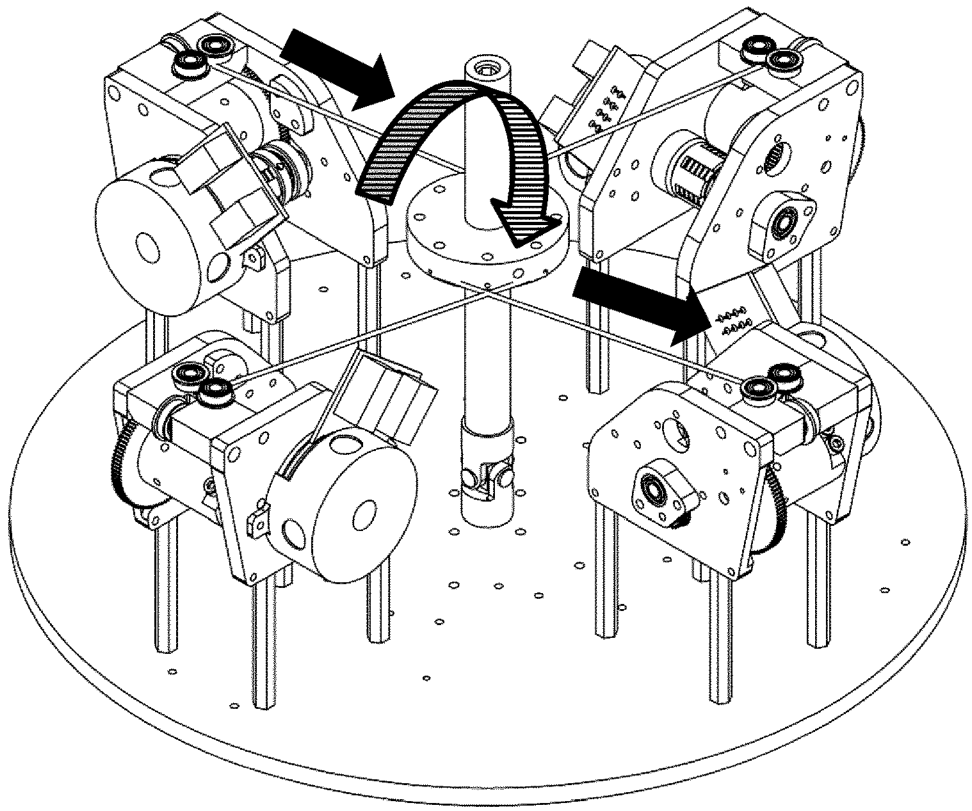
FIG. 27 depicts a roll DOF of the device shown in FIG. 25.

FIG. 27 shows an example of a coordinated action of motorized cable-winch units within the variant alignment of the motorized cable-winch assembly 120 to produce a DOF of roll motion of the central rod 150. The roll motion of the rod is indicated by a striped arrow, while black arrows indicate coordinated motion of motor controlled cables to actuate the roll motion. More specifically, only the third winch mechanism rotates to apply tension in the cable while the fourth mechanism generally diametrically opposite releases cable and the first and second mechanisms keep the length of their cables steady without moving, which consequently creates roll motion in the central rod.

Figure 28:
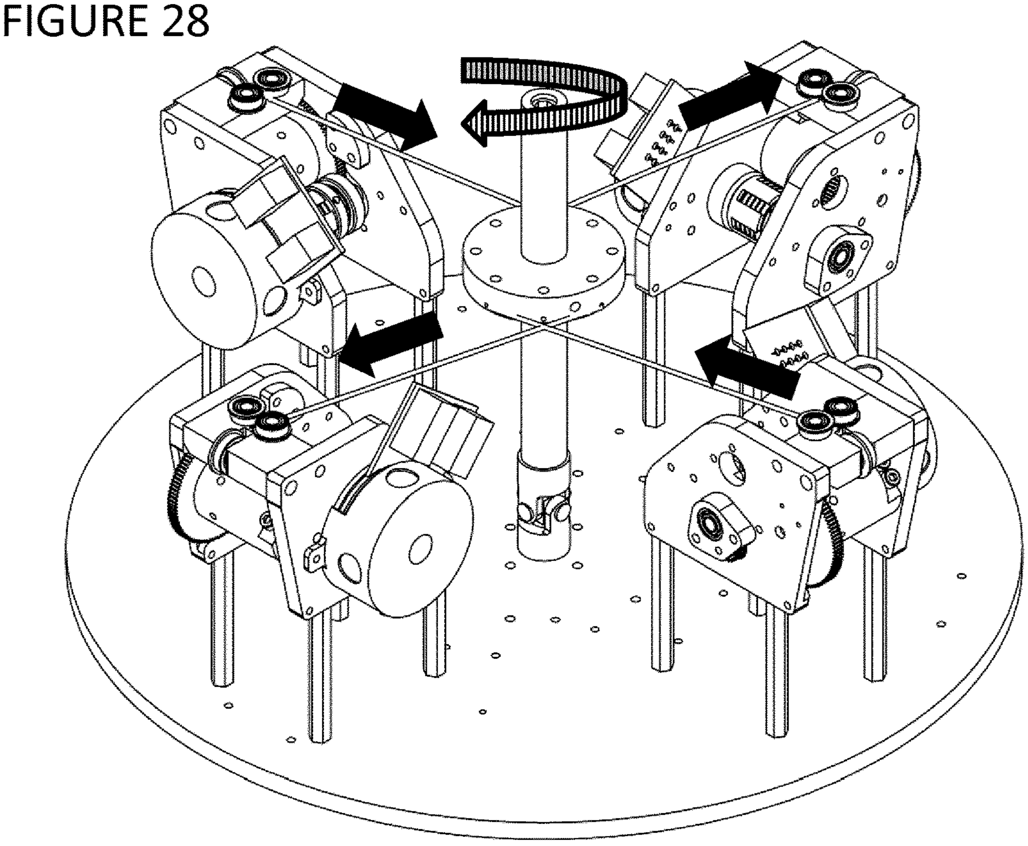
FIG. 28 depicts a yaw DOF of the device shown in FIG. 25

FIG. 28 shows an example of a coordinated action of motorized cable-winch units within the variant alignment of the motorized cable-winch assembly 120 to produce a DOF of yaw motion of the central rod 150. The yaw motion of the rod is indicated by a striped arrow, while black arrows indicate coordinated motion of motor controlled cables to actuate the yaw motion. More specifically, the first mechanism rotates to apply tension in its cable and the second mechanism generally diametrically opposite also applies an equal tension to its cable, while the third and fourth mechanisms both release cable, which consequently creates yaw motion in the central rod.

End-effectors are not limited to adaptors for engaging hands and feet, and may be configured for any suitable body part, such as a sleeve or brace for a forearm, elbow, shin/calf, knee, and the like. Handles, straps and fasteners may be used in any desired combination.

The central rod is not critical for the dome-wheel module. The central rod serves a purpose of connecting to the dome to bias the dome against the first motorized wheel assembly. For example, the biasing function may be readily accomplished by filaments or wires connecting the base to the dome, with the biasing tension of the wires being adjustable. Similarly, combinations of rods and wires may be used. When a rod is not incorporated then the end-effector may be connected to the dome.

Materials, selection of electrical and/or mechanical components, and techniques of manufacture for configuring the rehabilitation device for a specific implementation are well recognized by the skilled person and any material and configuration of components described herein is for illustrative purposes only, and numerous equivalents are available to the skilled person.

The support working surface for the mobile base module may be any suitable hard planar surface that provides sufficient friction. A floor surface or a table surface may have suitable properties. Portable mats or pads may also be constructed to provide a working surface. The ground (working) mat can be made from any material with any hardness level as long as the surface of the mat stays flat during the operation of the robot. The coefficient of the friction between the mat and the wheels of the robot can typically have any values from 0.1 to 0.9. Operable values often range from 0.3 to 0.8, but values outside this range can be accommodated. An illustrative example of a ground mat comprises a hard, rigid piece of wood (to ensure flatness) plus an adhesive layer of rubber (Viton) to increase the friction coefficient of the contact point with the wheels.

Any type of suitable power transmission mechanism (PTM) may be used including for example, belt drives, chain drives, gear drives, cable drives, rope drives, and the like. For the application of rehabilitation, the choice of PTM can take into consideration that the accuracy of the motion is of the order of 0.1 mm. Additionally, the size of the PTM should be small and light for the mobility of the device and/or portability of the device. Gear type PTM can readily meet these considerations. In other implementations, cable or belt PTM may be used. A significant consideration of end-effector type rehabilitation devices, for example for UE application, is the low intrinsic impedance of the end-effector. This feature is particularly useful in the assistive stages of therapy when the patient tries to move the limb without any help from the device. At this stage, the device should provide lower resistance to the patient as the patient's impaired limb as the muscles are still weak and the device should reduce resistance to the motion. Having this feature in mind leads to a transmission mechanism that is back-drivable, or in other terms provides a lowered power transmission ratio (PTR). As the application of this device also provides LE rehabilitation, to satisfy the output force requirements, the power transmission mechanism should provide enough output force. This means that to keep the size and power of the actuators as low as possible, the PTR should be high enough to increase the output torque of the actuator. Keeping PTR low for UE and high for LE is an advantage of a mechanism with multi-setting adjustable PTR that can be adjusted easily.

Safety features of the device in case of sensor failure in detecting the force transferred to the user (eg., patient), are provided for the mobile base and dome-wheel module and cable-winch module. In the mobile base as the motion is created by omni-wheels on a supportive surface, the amount of the transferable forces/torques can be adjusted in two ways, (a) by changing the PTR and (b) by changing the type of material of the supportive surface, such as a pad or mat. Modifying the PTR based on the application type (eg., UE or LE) will limit the output force created by the device. Also changing the material of the pad or mat will change the friction coefficient between the wheels and the mat and limits the output force generated by the device. For the dome-wheel module, the amount of the transferred torque can be limited with changing the PTR and by adjusting the normal force between the dome and the wheels. In the cable-winch module, the amount of the transferred torque can be limited by changing the PTR and by changing the slippage threshold of the friction clutches. Safety features are optional, but are often incorporated for the noted advantages. One or more safety features may be incorporated and may be combined as suited with other conventional safety features.

Both the dome-wheel and cable-winch modules may be mounted on either a mobile platform or a stationary platform. Although the mobile platform necessarily includes more components than a corresponding stationary platform, maintaining a sufficiently low weight to allow portability may be desired for both types of platforms. In addition to portability, lightness of structure can also provide advantages of decrease in sizes of actuators and decrease of endpoint impedance. In this context, the weight and size of the base can be selected for combination of lightness and strength. For example, a single base plate made from aluminum alloy 7075T6 with the thickness of 6.35 mm and the overall diameter of 290 mm may suffice to support dome-wheel or cable-winch modules for both UE and LE applications. The thickness of the plate is calculated to endure the maximum force of 1000 N with the safety factor of 4. The finite element analysis is performed using SolidWorks Simulation with static loading conditions. The diameter of 290 mm is a sufficient size that can fit all components attached and enclosed inside the base plate. Minimizing the base diameter will decrease the overall size of the device and consequently makes the device more suitable for UE application and increases portability. However having a small base for the mobile platform will decrease the distance between contact points of the wheels and the ground padding which can result in tilting the device specifically in the LE application. To address this issue, a foldable mechanism (stabilizing arms) is designed on the side of the mobile platform that can be opened in the LE mode for increasing the contact point of the device with the ground. It can also be folded inside to decrease the overall size of the device in UE mode. Using stabilizing arms, the distance between the contact points can be increased two times or any other convenient multiple without changing the size of the device base.

Figure 29:
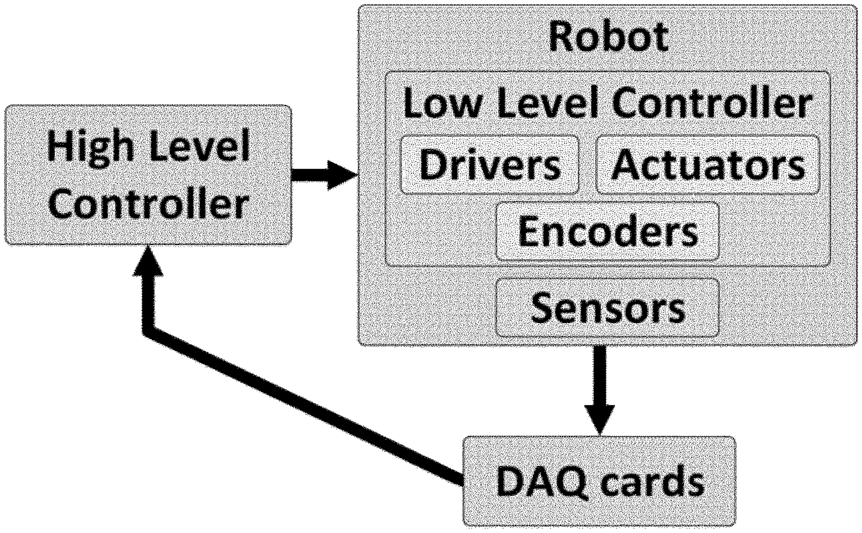
FIG. 29 shows a control schematic for a robotic implementation of a rehabilitation device.

The device in each of its combinations is amenable to computer control and robotic implementation. Computer control and robotic implementation require installation of processing and communication devices (such as command input interface) and also benefit from incorporation of other electronic devices, such as sensors. A schematic illustration of a robotic implementation is shown in FIG. 29.

To allow for different rehabilitation exercises (such as passive movement therapy and kinesthetic interactive therapy), different modes of operation are needed, namely: position, velocity, and current control modes. For each mode, the corresponding feedback is useful, particularly in a robotic implementation. Examples of useful feedback modalities are (a) the position, (b) the velocity and (c) the current of the actuators together with (d) the force resulting from the interaction between the patient's limb and the robot.

Localization Sensor.

Figure 30A:
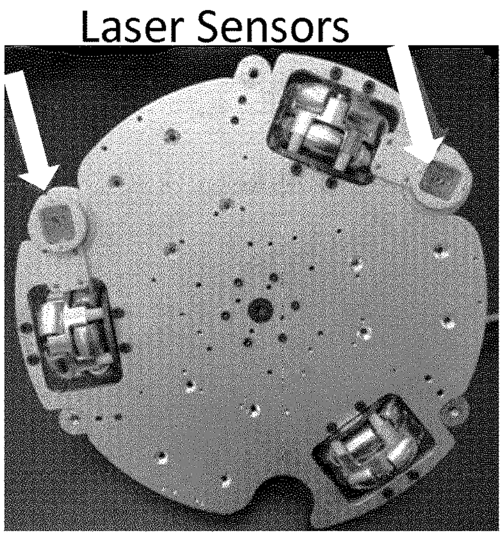
FIG. 30 shows localization sensors mounted to the mobile base module.

To localize the position of the mobile base on the ground mat, different methods are possible. One method is a stereoscopic vision tracking system developed by ClaroNav with a Micron Tracker model BB-BW-S60 stereo camera. Using this technique requires the camera to be installed beside the workspace and the tracking patterns to be attached to the robot while being visible to the camera at all times. This brings challenges in the calibration process. Additionally, the update rate of the position measured using the tracker is 30 Hz that is low for high-quality control required for therapeutic applications. Other methods have been developed to overcome these challenges. To achieve accuracy in motion with low overall cost, conventionally available incremental sensors may be deployed. Comparison between different incremental sensors finds useful examples, including the use of two ADNS-9800 laser motion sensors to measure the relative displacement of the robot's base on the ground mat. The sensors are attached at suitable locations on the bottom of the base plate (FIG. 30A) to measure the velocity of the motion in two directions. Each of these sensors is able to measure the incremental motion in two directions (local x and y coordinates). By infusing the data collected by two sensors, the amount of movement in two linear directions (global "X" and "Y") and one rotation (global "Z" direction) can be measured. For the type of motion expected for therapy application, the position of the robot can be measured with the accuracy of 0.05 mm on the ground mat.

Figure 30B:
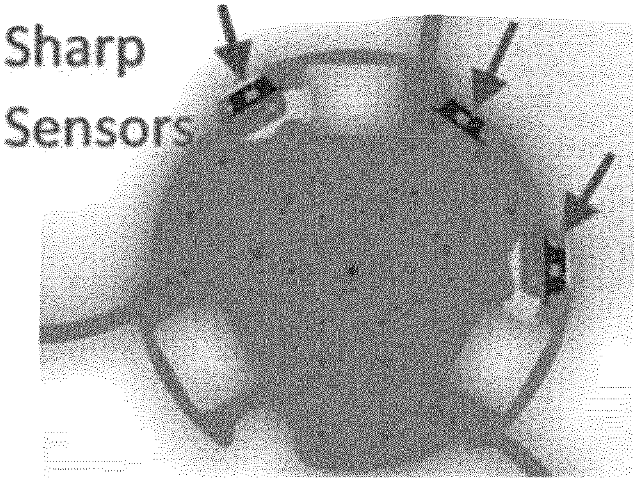

The laser sensors can be enhanced by use of Sharp GP2Y0A21YK, to provide global motion measurement. These sensors can measure the distance between the robot and the surrounding walls of the workspace with the accuracy of 5 mm up to the range of 1.5 m and are attached on the side of the mobile base as shown in FIG. 30B. While the laser sensors can function alone, by infusing the high accuracy measurement of incremental laser sensors and the low accuracy data of these absolute proximity sensors, the global position measurement of the robot can be enhanced.

Orientation Sensor.

To illustrate measurement method of the orientation and the angular velocity of the central rod, two alternative representative methods are presented, namely, (i) indirect method using the position of the actuators and kinematics calculations, and (ii) direct measurement of the rod's position. It should be noted that the indirect method cannot be used as feedback for the position/velocity control loop of the robot in implementations incorporating the mechanical safety feature that allows the wheels to slip in the dome-wheel module or clutches to slip in the cable-winch module when the applied force is higher than the adjusted threshold. As a result, it is not advisable to calculate the Cartesian domain motion of the end-effector of the robot (which interacts with the patient's limb), based on the joint space measurements of the actuator position.

The alternative solution is the direct measurement of the orientation and the angular velocity of the rod. For this purpose, one approach is to attach incremental or absolute encoders to the corresponding axes of the rotational joint at the base. However, due to the size limitation of the rotational joint and the cost of the encoders in small sizes, this method may not be the best option. Another alternative is to attach a gyro sensor to the rod to measure the orientation of the robot's end effector. By integrating the output of the gyro, which is the angular velocity in two DOFs provided in precise interrupt cycles, the relative amount of rotation with respect to the initial position can be measured. An example of a suitable gyro sensor is the Triple axis gyro breakout board MPU6050 with 16 bits ADC and the full-scale range of ±2000 d ps. By using this sensor, an accuracy of $3\times10^{-2}$ deg/sec in angular velocity can be achieved which is high enough to control the orientation of the rod. The sensor is attached to the rod.

A further useful option is to use the estimated position calculated by the indirect method to measure the amount of slippage that may occur. This can be done by comparing the position measured with direct method and the position obtained from the indirect measurement. The slippage calculation is beneficial in practice to (a) minimize the power consumed by the actuators during slippage episodes, and (b) prevent excessive erosion caused by slippage between the inner surface of the dome and the wheels in the dome-wheel module or the clutches in the cable-winch module.

Force Measurement.

To allow for haptics-enabled therapies, the amount of interactive forces and torques between the patient and robot is advantageously measured. One illustrative method to measure the interaction forces and torques is to install a force sensor at the interface of the robot and the patient's limb. Considering different factors such as the range of the force in LE therapy, the size of the force sensor, the data acquisition technique, and the price, a six-axis HEX-70-CE-2000N OptoForce sensor is presented as an example of a suitable force sensor. The maximum update rate of the sensors data is 1 kHz that can be read through the DAQ module using UART interface. The force sensor is attached between the end-effector and the second end of the central rod, for example between the hand-grip handle and the central rod (FIG. 9) or between the foot plate and the connecting rod.

Actuators.

There are a variety of motors feasible for the device in a robotic implementation, namely, EC or DC motors from different manufacturers. Some of the considerations regarding the actuator selection are drivers availability, ease of use, high-speed communication, size, weight, operating voltage and technical support of the manufacturer. Maxon EC flat motors is an example of a suitable motor that can provide high torque at low speed with a reasonable price. This option is suitable for this particular application due to the weight and size constraints and comparably higher output torque on other motors. MAXON EC45 50 W 36V motors were selected to drive the Omni-wheels with continuous and stall torque of 0.09 Nm and 0.48 Nm, respectively. To decrease the amount of wiring to and from the mobile platform, the drivers are designed to be installed inside the perimeter of the mobile base. This way the connection between the motors and drivers is inside the perimeter of the mobile base and the cabling is minimized. Guidance for driver selection is as follows.

Electronic Driver Selection.

Selection of electronic drivers considers criteria such as (a) power, (b) operating voltage of the actuator, (c) available space for installation, (d) possible modes of operation (position, velocity or current modes), and (e) communication interface. To deliver various types of rehabilitation exercises (such as passive movement therapy and interactive kinesthetic therapy), it is useful to control the actuators in one or more of position control, velocity control and current control modes of operation. To achieve high-quality force and torque control, a high operating frequency of the low-level control loop is useful. It has been shown that for general haptic rendering systems, the sampling frequency defines the allowable strength of the force reflection. This is related to the concept of Z-width. In this regard, the capability of the implemented communication interface plays a significant role in the sampling frequency and the speed of the control loop. This is due to the different Baud-rates of the interfaces which directly affects the speed of the control loop.

For the selected actuator, based on different the operating voltages and currents, Maxon provides a variety of digital positioning controllers. To minimize the size and the price of the controller, the EPOS2 Module 36/2 is a suitable example which has the desired control modes with 1 Mb/sec USB/CANOpen communication interfaces. In examples using six motors, this module allows connection of all six drivers in series and control of the actuators using USB/CANOpen interface on the first Node.

Processing and Communication Devices.

In this example, for high-level control, the real-time Quarc library (from Quanser Inc, Markham, ON, Canada) is used in MATLAB/Simulink. Quarc library provides powerful tools and capabilities such as real-time and multi threaded control that can easily interact with hardware interfaces like Ethernet and DAQ cards. To simplify and reduce the amount of wiring and cabling, a local intermediate processing system was utilized as an interface between the robot and Quarc. The task of this processing unit is to receive actuator commands from the high-level controller and send them to EPOS drivers, while it reads the sensor's data and sends them back to the high-level controller. Based on the computational power and the size required for this processing unit, a Raspberry Pi (RPI) version 3B was selected as the low-level processing unit on the robot.

Figure 31:
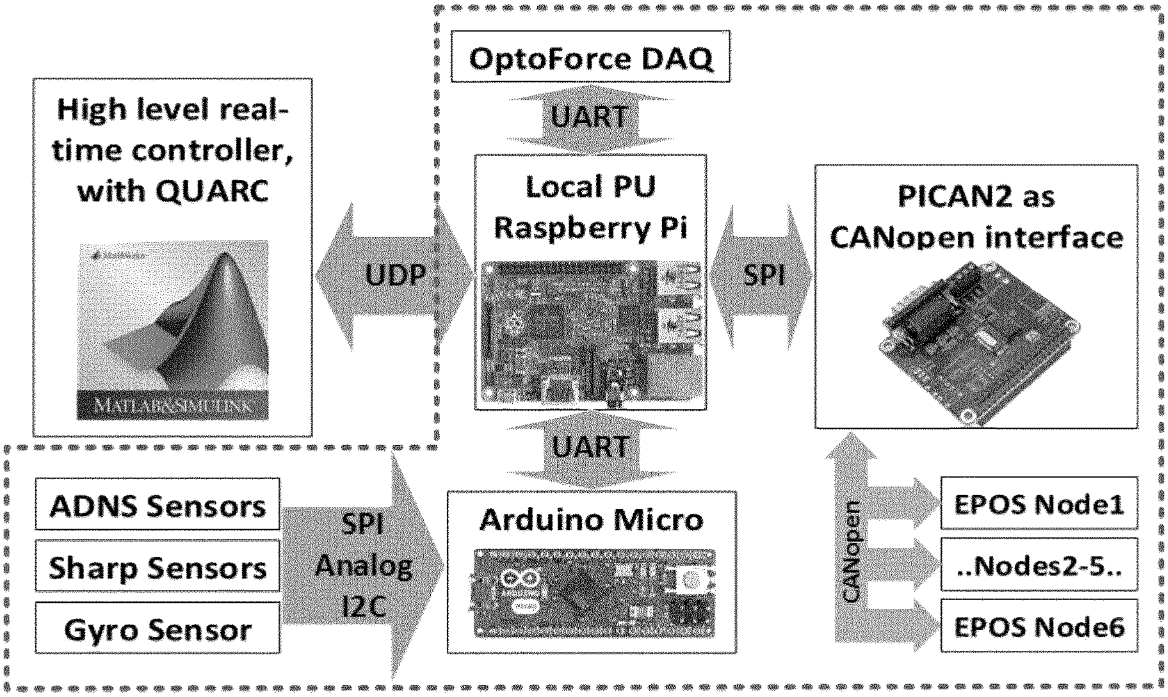
FIG. 31 shows a computer system architecture and communication protocol between different components of the system with the components inside the mobile base enclosed in a dashed line.

The data transfer protocol between Quarc and Raspberry Pi is based on the UDP protocol via an Ethernet cable. This communication interface provides fast and real-time (measured transfer time<400 μs for 64-Bytes packet size) data transfer between the high- and the low-level controllers. The schematic diagram of the system and the components involved together with the communication protocol are shown in FIG. 31.

It should be noted that to achieve a robust and high-quality force and torque control, the high-level controller loop is suggested to have the update frequency of at least 1000 Hz. This means that the low-level control loop should be able to send the command data and receive the feedback (position, velocity or current) from all EPOS drivers and the feedback data from OptoForce DAQ and gyro sensor in less than 1 ms for each loop. Based on the communication data-sheet of the Maxon driver, using USB interface an update rate about 2.3 ms can be achieved for each driver. This would result in a total sample time of 13.8 ms to send and receive data to/from the six EPOS drivers. To make communication between Raspberry Pi and the EPOS drivers faster, the CANOpen interface is used by attaching a PICAN2.0 shield to the Raspberry Pi. Using the Socket CAN library, the sample time including all EPOS drivers was reduced to 1 ms. FIG. 31 shows the communication diagram for transferring data between Raspberry Pi and EPOS drivers.

Programming the PI.

Some of the interesting features of the RPI are (a) small size unit with comparably powerful processing power (as small as a mobile phone), (b) wide variety of I/O interfaces like Universal Asynchronous Receiver/Transmitter (UART), Serial Peripheral Interface (SPI), Ethernet (LAN and WAN) and (c) providing the Linux operating system environment (Raspbian) for developing the codes and User Interfaces (UI). Having all of these interesting features together was the reason to select RPI as a suitable example of the Local Processing Unit (LPU) as (a) it can be used to read the sensors data locally (eliminates lots of cabling to and from the robot) (b) communicate (send the commands and receive feedback of the motors) with the drivers using Serial or CANOpen protocol, (c) send and receive the control commands to the PC running MATLAB using UDP protocol. Adding all of these features significantly reduces the amount of cables attached to the robot which is favorable when the robot is a mobile platform. In this example, to optimize the RPI for running the local control loop, overall tasks are split into 4 major semi-independent functions: (I) Controlling the EPOS drivers, (II) UDP send and receive, (III) Configuring and reading OptoForce data and (IV) Reading the sensors data from Arduino through UART. Here the details of each task will be described (I) Controlling the EPOS Drivers Using RPI USB vs CANOpen.

To connect the EPOS2 drivers to the RPI, the first interface option used is the USB. By using the libraries provided by Maxon for Linux systems, a C++ program was developed to control the EPOS drivers in Raspbian by sending and receiving the command to the Node1 while elapsed time being measured. It took 8 ms on average to send and receive the command and feedback to one Node of EPOS drivers. When in total, the system has 6 actuators (Driver Nodes), it will take about 48 ms to command all actuators in one control loop. This amount of elapsed time will limit the control loop speed to 20 Hz which is a lot lower than desired value of 1 kHz for high-quality digital control of the system. The problem with the slow communication speed is found to be the USB communication interface in the RPI. Based on the Maxon datasheet, to increase the speed of communication, CANOpen interface on EPOS is suggested. As the RPI does not have CANOpen interface, this led us to use the PICAN2 shield on RPI for CANOpen communication to control the EPOS2 drivers with faster speed.

By using SocketCan libraries, contributed by Volkswagen Research to the Linux kernel, another code was developed to control EPOS2 on Raspbian. Using this method, the elapsed time for sending the command data to each EPOS Node was decreased to 150 us which means that for 6 Nodes the elapsed time will be 900 us. As this elapsed time value is below 1 ms, having a control loop with the speed of 1 kHz would be possible.

Modes of Control.

Different modes of control can be defined in the EPOS drivers in addition to the different type of feedback. Controlling the drivers in a low-level C++ code in RPI requires defining the mode of operation (profile position, velocity or current) and type of feedback (actual position, velocity or current) from EPOS drivers. As a summary, the procedure that should be followed in setting and operating the drivers in the CANOpen protocol are listed in Table 2. In order to communicate between the Simulink and the developed code on RPI for controlling the robot, eight modes of operation for EPOS is defined as summarized in Table 3. There are two main modes of operation, (a) Setting mode with the ID "333" and (b) Operating mode with the ID starting with "1". In the last version of the developed code as shown in Table 3 there are ten operating modes for different commands and feedback.

It is worthwhile noting that in the first 0.01 s of the start of the Simulink code, the Setting Mode will be activated to set the parameters in EPOS drivers, and after that, the specific operating mode will be activated. The mode of operation will be sent to RPI in the initial stage of the high-level control code in Simulink after Setting mode.

TABLE 2

EPOS configuration procedure for initialization, enabling and operating

| | |
|---|---|
| Initialization | Opening Communication to CAN-network<br>Defining PDO and SDO masks and opening the Socketcan network<br>Configuring the each Node<br>Resetting the NMT connection<br>Entering the Pre-operational<br>Setting the Operation mode (Profile Position, Velocity or Current Mode)<br>Configuring the parameters of each node(for example profile maximum acceleration, maximum velocity, maximum current, PID values and etc)<br>Setting the PDO configuration, e.g. defining PDO Receive and Transmit type plus setting the number and type of Rx and Tx packages(in other words defining the type of command being sent to the EPOS and feedback like actual position, velocity or current) |
| Enabling | Entering Pre-Operational Mode<br>Shutting down the drivers<br>Switching on and enabling<br>Entering operational mode by opening the PDO |
| Commanding and receiving feedback | Sending proper PDO command(target position, velocity or current) by writing in SocketCan<br>Requesting the drivers for sending proper PDO feedback (position, velocity or current) |

TABLE 3

Different modes of control defined at the developed code in RPI for EPOS drivers

| Mode ID | Definition |
|---|---|
| 111 | Profile position mode with actual position feedback |
| 112 | Profile position mode with actual velocity feedback |
| 113 | Profile position mode with actual current feedback |
| 121 | Profile velocity mode with actual position feedback |
| 122 | Profile velocity mode with actual velocity feedback |
| 123 | Profile velocity mode with actual current feedback |
| 124 | Profile velocity mode with No feedback |
| 131 | Current mode with actual position feedback |
| 132 | Current mode with actual velocity feedback |
| 133 | Current mode with actual current feedback |
| 333 | Setting Mode |

(II) UDP Send and Receive

UDP Packet Definition.

As mentioned above the data transfer between mobile processing unit (RPI) and MATLAB (Simulink on PC) will be via Ethernet connection using UDP protocol. This is the fastest way of data transfer using a single Ethernet cable attached to the mobile platform. Having this option is useful as WiFi module of the RPI can be utilized (by keeping the communication protocol same as above) to eliminate the need for the Ethernet cable to be attached to the robot. For this purpose the Stream Client block provided by Quanser in Simulink is used to send the UDP packets to RPI and Stream Server block is used for receiving the UDP packets from RPI. The packet size for the data transferred from Simulink to RPI is nine four-bytes double type. The packet contains the following structure as shown in Table 4. For the feedback data from RPI to Simulink, the packet size is twenty-one four-bytes double which is described in Table 5. The measured elapsed time to send and receive the packets through UDP is approximately 400 microseconds that is lower than the 1 ms loop time in Quarc Simulink.

TABLE 4

Sent packet configuration from Simulink to RPI

| | |
|---|---|
| In the Setting Mode | [Setting Mode; Max Profile Acc Dcc; Max Current; Max Profile Velocity; KP PID; KI PID; KD PID; OptoForce Zeroing ; Motor Enable] |
| In the Operating Mode | [Operating Mode; Node1 desired Command; Node2 desired Command; Node3 desired Command; Node4 desired Command; Node5 desired Command; Node6 desired Command |

TABLE 5

Received packet configuration from RPI

| | | |
|---|---|---|
| Feedback Data Packet: | Gyro sensor | 2 doubles |
| | Sharp sensor | 3 doubles |
| | ADNS sensor | 4 doubles |
| | OptoForce(Fx, Fy, Fz, Tx, Ty, Tz) | 6 doubles |
| | EPOS feedback | 6 doubles |

(III) Reading OptoForce Data

In this example, there are three options available for communicating to the OptoForce DAQ card, (a) RS232 (b) UART through USB and (c) CANOpen. To have a secure connection, USB connection is used to connect DAQ card to RPI. A code was also developed and tested to read the data from OptoForce DAQ card at 4 different update rates, 1 kHz, 333 Hz, 100 Hz and 33 Hz. In this example, the fastest update rate (1 kHz) is selected. First, in the Setting Mode, the zeroing command will be sent to the DAQ card and in the Operating Mode, the data will be read through UART.

(IV) Reading Data Through UART from Arduino

Although SPI and I2C are among available interfaces to attach sensors and read data by RPI, analog sensors cannot get connected to it directly. To overcome this issue, all of the sensors namely ADNS, Sharp and Gyro are connected to an Arduino Micro with SPI, Analog, and I2C interfaces respectively to configure and read the data. After reading sensors data using Arduino Micro which will take less than 1 ms, the data will be sent to RPI through the serial protocol (UART). A suitable code is developed in RPI to read the data from Arduino.

Multi-Thread Code on RPI.

Despite all of the advantages of RPI (eg., small size, a variety of interfaces, etc), the processing power of the CPU is limited. In this example, to make sure that local control loop on RPI takes less than 1 ms to complete, a multi-core thread code was developed to run four main semi-independent tasks that mentioned earlier. For this purpose, the "pthread" library is used to run four parallel threads for running four above-mentioned infinite-loop functions. By using this library, all functions can complete the functional loop in less than 1 ms and will be ready for the next precise command loop controlled by Quarc in Simulink.

Specific components such as sensors, actuators, electronic drivers, controllers and the like, are mentioned for the purpose of providing illustrative configuration of the rehabilitation device and robotic implementations. It should be recognized that none of the specific selected commercially available components are critical to the operation of the device, and may readily be substituted with other commercially-available or custom-designed equivalents.

Figure 32A:
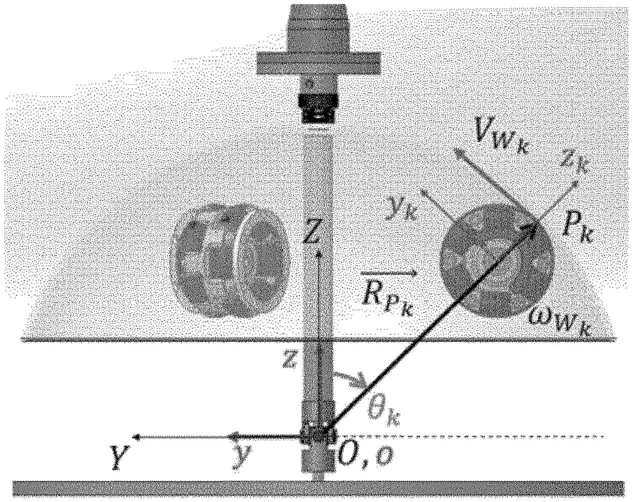
FIG. 32 shows global and local coordinates assigned to describe kinematics of a dome-wheel module.
Figure 32B:
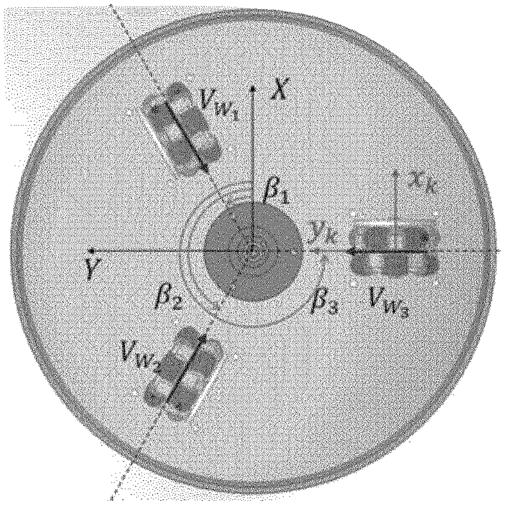
Figure 33:
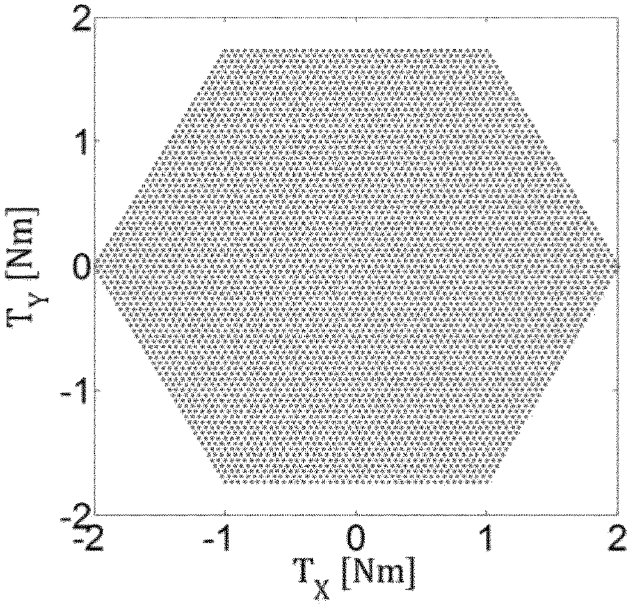
FIG. 33 shows a map of possible normalized torque achievable in roll and pitch derived from coordinate scheme shown in FIG. 32.

Desired physical parameters of a therapy or training may be derived from multiple sources including the existing literature, physiotherapy professionals, end-user feedback, and the like. Once physical parameters of a therapeutic or training implementation are determined, mathematical modeling can be used to determine a suitable configuration of actuators in the dome-wheel, cable-winch, or mobile base modules. For example, based on the desired range of force and velocity of movement given in Table 1, an estimate of the power required for the dome-wheel or cable-winch modules and corresponding actuators can be calculated as explained below. Based on the existing designs of ankle training robots in the literature, a rotational speed greater than π/2 rad/s is not usually expected. Also, considering the required output torque given in Table 1 the minimum power of the orientation mechanism can be calculated as $$P_S = T \times \omega = 40 \text{ Nm} \times \pi/2 \text{ rad/s} = 62.8 W \quad \text{(Eq. 1)}$$

where $P_S$ is the minimum power required, T is the minimum output torque and co is the minimum output velocity of the system. In the example of three actuators in both dome-wheel and cable-winch modules, calculation of the minimum power of the actuator in one module, can be used to select and configure the actuator to generate the output torque in the other module as well. In the case of the dome-wheel module, to calculate the contribution of each wheel on the overall power, a static analysis of the output force is performed. As shown in FIGS. 32A and 32B, considering the alignment of the omni-wheels, the contribution of each wheel in generating motion in the roll and the pitch directions can be summed up to create $T_X$ and $T_Y$, as $$\begin{bmatrix} T_X \\ T_Y \end{bmatrix} = F_{W_1} R_P \begin{bmatrix} \frac{-1}{2} \\ \frac{\sqrt{3}}{2} \end{bmatrix} + F_{W_2} R_P \begin{bmatrix} \frac{-1}{2} \\ -\frac{\sqrt{3}}{2} \end{bmatrix} + F_{W_2} R_P \begin{bmatrix} 1 \\ 0 \end{bmatrix} \quad \text{(Eq. 2)}$$

$$-F_{max} < F_{W_k} < F_{max}$$

$$k = \{1.2.3\}$$

Where $T_X$ and $T_Y$ represent the generated torque in the roll and the pitch directions, respectively. Moreover, $R_P$ is the distance between the contact point of the wheel and the center of rotation of the dome. In this design, $R_P$ is the same for all wheels. In addition, $F_{Wk}$,k={1, 2, 3}, are the forces applied by each wheel which can vary in the range [−Fmax, Fmax]. Using (Eq 2) the contribution of each actuator in generating the total torque output can be calculated. To simplify the analysis, this equation is normalized with respect to the geometrical parameters. For this purpose, the normalized value of Fmax is 1 N and the normalized $R_P$ is 1 m. FIG. 33 shows all possible values of $T_X$ and $T_Y$ when $F_{Wk}$ varies in the range of [−1, 1]N. Changing the values of $T_X$ and $T_Y$ generates the torque in the range of [−2, 2] Nm and [−√3 √3] Nm for $T_X$ and $T_Y$, respectively (note that symbol represents square root).

Based on the force decomposition shown in (Eq 2) and visualized in FIG. 25, the amplitude of the output torque vector $$T = \sqrt{T_X^2 + T_Y^2} \quad \text{(Eq. 3)}$$

has the least value equal to √3 Nm in the "X" direction. Consequently, to achieve the required power for the system in all directions, the power of each actuator should be at least 1/√3 of the total required power. This gives us a value of 36.3 W for each actuator in an orientation mechanism that can be used in both dome-wheel and cable-winch modules for the example of three actuators.

Similar derivations can be made for the mobile base to compute the minimum power required by the actuators. As mentioned in Table 1, for an LE application maximum force in the planar direction is 400 N and for the therapy procedure, a velocity more than 0.2 m/s is not expected. This means that the minimum power required by the system for the mobile platform is 80 W (product of force and velocity). Using a Jacobian matrix, the minimum power required by each actuator, for a three actuator example, can be calculated as 1/√3 of the total power which will be 46 W.

In further examples of mathematical modeling data acquisition algorithms of the sensors are described.

ADNS Localization.

Figure 34:
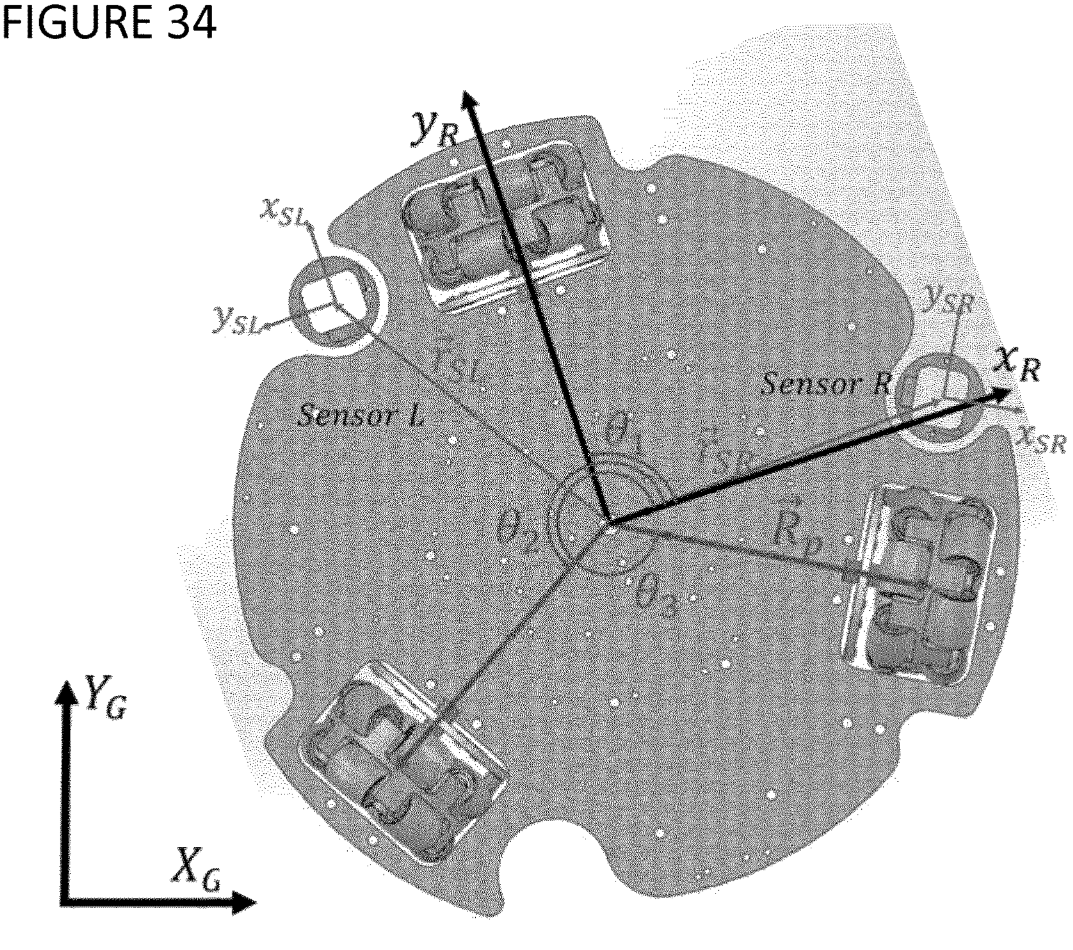
FIG. 34 shows coordinates assigned for localization using incremental laser sensors installed on a mobile base module.

The incremental motion captured by the ADNS laser sensor in the 1 ms step-time is sent to Simulink code. The goal is to transfer the data collected from the two ADNS sensors to measure the amount of motion of the base plate with respect to the initial position of the robot at the start of the program. Using the method provided in (Cimino and Pagilla, "Optimal location of mouse sensors on mobile robots for posi-tion sensing," Automatica, vol. 47, no. 10, pp. 2267-2272, 2011), the incremental displacement measured by the sensors can be transferred to the global position and orientation of the robot's base plate. As shown in FIG. 34 four coordinate systems are assigned, (a) the global coordinate system attached to the ground mat $C_G$, (b) local coordinate on the center of the robot $C_R$, (c) a coordinate system attached to the position of right sensor $C_{SR}$ aligned with the direction of the measurement and (d) a coordinate system attached to the position of left sensor $C_{SL}$ aligned with the direction of the measurement. The location of each sensor, $O_S$, is determined by the position vector $r_s$ with the angle $\psi_S$ with respect to $X_R$. The angle between $X_S$ and $X_R$ is shown by $\varphi_S$. The incremental displacement measured by the sensors can be shown in the vector format $\Delta^S{}_{OS} = \{\Delta X_{SR}, \Delta Y_{SR}, \Delta X_{SL}, \Delta Y_{SL}\}^T$. Here SR is the sensor attached to the right side of the base plate and SL is the one on the left side. To transfer the measurement from the local sensor coordinate frame, $C_{SR}$ and $C_{SL}$, to the global coordinate frame, the rotation matrix R(θ+φ) can be used. The incremental displacement of the $O_R$ in the global coordinate, Au can be calculated by using Eq. 4.

$$\Delta u = F + b \quad \text{(Eq. 4)}$$

where $F^+$ is the pseudo inverse of F $$F^+ = (F^T F)^{-1} F^T \quad \text{(Eq. 5)}$$

-continued $$F = \begin{pmatrix} 1 & 0 & -r_{SR}\sin(\theta+\psi_{SR}) \\ 0 & 1 & r_{SR}\cos(\theta+\psi_{SR}) \\ 1 & 0 & -r_{SL}\sin(\theta+\psi_{SL}) \\ 0 & 1 & r_{SL}\cos(\theta+\psi_{SL}) \end{pmatrix} \quad \text{(Eq. 6)}$$

$$b = \begin{pmatrix} \cos(\theta+\phi_{SR}) & -\sin(\theta+\phi_{SR}) & 0 & 0 \\ \sin(\theta+\phi_{SR}) & \cos(\theta+\phi_{SR}) & 0 & 0 \\ 0 & 0 & \cos(\theta+\phi_{SL}) & -\sin(\theta+\phi_{SL}) \\ 0 & 0 & \sin(\theta+\phi_{SL}) & \cos(\theta+\phi_{SL}) \end{pmatrix} \vec{\Delta}^{S}_{OS} \quad \text{(Eq. 7)}$$

By integrating the Au over time, the position vector of the robot's center $O_R$ can be calculated as $u_{t+1}=u_t+\Delta u$.

To control the position, and the velocity of the robot, the mathematical relations between the velocity of the robot in local coordinate $\{v_x, v_y, \omega_z\}^T$ and the rotational velocity of the wheels $\{\omega_1,\omega_2,\omega_3\}$T is required. As shown FIG. 32A the center of the robot is shown with a vector _Rk to the contact point of each wheel with the mat. The angle between the vectors _Rk and the axis x is assigned with angle $\theta_k$, k={1,2,3} as depicted in FIG. 32A. The relation between the robot's velocity in local coordinate $\{v_x, v_y, \omega_z\}^T$ and the wheel's rotational velocity can be represented as in Eq. 8. In this equation, the $r_w$ is the radius of wheels and the $R_P$ is the distance between the center of the robot and the contact point of the wheels with the mat.

$$\begin{pmatrix} \omega_1 \\ \omega_2 \\ \omega_3 \end{pmatrix} = \frac{1}{r_w}\begin{pmatrix} -\sin\theta_1 & -\cos\theta_1 & 1 \\ -\sin\theta_2 & -\cos\theta_2 & 1 \\ -\sin\theta_3 & -\cos\theta_3 & 1 \end{pmatrix}\begin{pmatrix} v_x \\ v_y \\ R_P\omega_z \end{pmatrix} \quad \text{(Eq. 8)}$$

Using Eq. 8 and having the desired robot's velocity in the local coordinate system, we can calculate desired wheel's rotational velocity that can be sent as the command to the drivers.

The method used here to derive the inverse kinematic model of the system uses the velocity-based kinematics approach in (Robinson et al, "Velocity-level kinematics of the atlas spherical orienting device using omni wheels," *Transactions of the Canadian Society for Mechanical Engineering*, vol. 29, no. 4, pp. 691-700, 2005). As shown in FIG. 32A, two coordinate systems are defined with Origins O and o, both at the center of the universal joint. The axes of the Global coordinate system $C_G$ are fixed at the base plane while those of the rotating coordinate system $C_1$ are fixed with respect to the dome. Another set of coordinate system $C_k$ are defined in the center of each wheel shown in FIG. 32A. Starting from the velocity of the point $P_k$ (the contact point of wheel k and the dome, on the wheel) we can calculate this velocity vector in the local coordinates of the wheels as $$v_{Pk}=\omega_k \times r_k=[\omega_k,0,0]^T\times[0,0,r_W]^T=[0,-r_W\omega_k,0]^T \quad \text{(Eq. 9)}$$

Here, $vP_k$ is the velocity of point $P_k$ in the local coordinates of $C_k$, $\omega_k$ is the rotational velocity of wheel "k". Moreover, $r_k$ and $r_W$ are position vectors of the point $P_k$ and radius of the wheel, respectively. Using the transformation matrix $T_k$ which maps the local coordinate of $C_k$ to the global coordinates of $C_G$, after two rotations with respect to $x_k$ and $z_k$, the velocity in $C_k$ can be mapped to that in $C_G$ as shown in Eq. 10.

$$V_{Pk} = T_k v_{Pk} \quad \text{(Eq. 10)}$$

where $$T_k = R_z(\beta_k)R_x(\theta_k) = \begin{bmatrix} -s\beta_k & -c\beta_k c\theta_k & c\beta_k s\theta_k \\ c\beta_k & -s\beta_k c\theta_k & s\beta_k s\theta_k \\ 0 & s\theta_k & c\theta_k \end{bmatrix} \quad \text{(Eq. 11)}$$

In this equation, "c" and "s" denote to cosine and sine of the variables, respectively. Knowing the velocity of the point of contact between the wheels and the dome in $C_G$, the angular velocity of the dome can be calculated as $$\Omega_k = \frac{R_k \times V_{P_k}}{\|R_k\|^2} \quad \text{(Eq. 12)}$$

In this equation, Rk is the radial vector which connects the origin of $C_G$ to the contact point $P_k$ and $\|R_k^2\|$ is the second norm of that vector. Also, $\Omega_k$ is the angular velocity of the dome generated by the $k^{th}$ omni-wheel, when other wheels are in free motion. Summing up the three angular velocity vectors generated by each Omni-wheel, the total angular velocity vector of dome can be calculated as $\Omega=\Sigma^3_{k=1}\Omega_k$. As a result, the Jacobian matrix can be obtained from the relation between the angular velocities of the wheels and the angular velocity of the dome as $$\Omega = J\omega = \frac{r_W}{\|R_k\|^2}\begin{bmatrix} J_{11} & J_{12} & J_{13} \\ J_{21} & J_{22} & J_{23} \\ J_{31} & J_{32} & J_{33} \end{bmatrix}\begin{bmatrix} \omega_1 \\ \omega_2 \\ \omega_3 \end{bmatrix} \quad \text{(Eq. 13)}$$

where $$J_{11} = -R_{1_Y}s_{\theta_1} - R_{1_Z}s_{\beta_1}c_{\theta_1} \cdot J_{12} = -R_{2_Y}s_{\theta_2} - R_{2_Z}s_{\beta_2}c_{\theta_2}$$

$$J_{13} = -R_{3_Y}s_{\theta_3} - R_{3_Z}s_{\beta_3}c_{\theta_3} \cdot J_{21} = R_{1_X}s_{\theta_1} - R_{1_Z}c_{\beta_1}c_{\theta_1}$$

$$J_{22} = R_{2_X}s_{\theta_2} - R_{2_Z}c_{\beta_2}c_{\theta_2} \cdot J_{23} = R_{3_X}s_{\theta_3} - R_{3_Y}c_{\beta_3}c_{\theta_3}$$

$$J_{31} = R_{1_X}s_{\beta_1}c_{\theta_1} - R_{1_Y}c_{\beta_1}c_{\theta_1} \cdot J_{32} = R_{2_X}s_{\beta_2}c_{\theta_2} - R_{2_Y}c_{\beta_2}c_{\theta_2}$$

$$J_{33} = R_{3_X}s_{\beta_3}c_{\theta_3} - R_{3_Y}c_{\beta_3}c_{\theta_3}$$

In Eq. 13, $R_{1x}$, $R_{1y}$ and $R_{1z}$ are the three components of the radial vector $R_k$. As can be seen from Eq. 13, the Jacobian is time invariant and depends only on the geometrical parameters of the system. Consequently, if the constants can be chosen such that J is non-singular, the angular speed of each omni-wheel ωk can be obtained using the desired angular velocity of the dome $\Omega_{des}$. Based on the singularity calculation performed in (Robinson et al. *Transactions of the Canadian Society for Mechanical Engineering*, vol. 29, no. 4, pp. 691-700, 2005), internal singularities occur only in impractical cases when the radius of the wheels becomes zero $r_w=0$ or the radius of dome tends to infinity $R\rightarrow\infty$. Boundary singularities still exist at the limits of the working volume of the mechanism, for example, when the connecting rod touches one of the wheels. Considering boundary singularities, the safe working volume of the robot is a cone with a tip angle of 30 deg. The tip of the cone is at the center of rotation, and the main axis is along the Z axis of $C_G$.

Therapy or Training Modes.

Based on a stage of recovery or training, different passive or active robot-assisted therapy modes may be used. For example, various therapy modes provided by robot-assisted rehabilitation can include, (i) passive mode, (ii) active mode, (iii) active assist mode and (iv) active resist mode. For example, in the earlier stages of therapy due to the weakness of muscles and inability of the patient in providing the voluntary motion, passive mode may be performed. In this stage, the goal is to decrease muscle atrophy and increase the movement range. By regaining strength in muscle and recovering more after therapy sessions, active modes can be used to engage the patient in the process of the rehabilitation. In this phase, the voluntary motion of the patient modifies the trajectory of the robot in performing the tasks so this stage of the therapy is referred to as patient-in-charge phase.

Active modes can be assistive in the initial stages to increase self-initiation in the patient on performing the tasks or they can be resistive to increase the strength of the muscles. Former mode is similar to therapist-in-charge phase in conventional therapy and the latter one is referred to as active-constrained mode.

In the robotic implementation of the rehabilitation device, various control strategies are implemented for passive, active-assist and active-resist therapy modes.

Control Strategy.

Many control strategies have been developed to utilize different feedback data such as position, force or bio-signals to provide proper therapy process and to control the interaction between the robotic systems and patient's body. Four illustrative control strategies for robotic assisted rehabilitation are: (a) position control, (b) force and impedance control, (c) EMG-based control and (d) adaptive control.

Position-Based Tracking Control (Robot-in-Charge Phase) Mobile Base.

Figure 35:
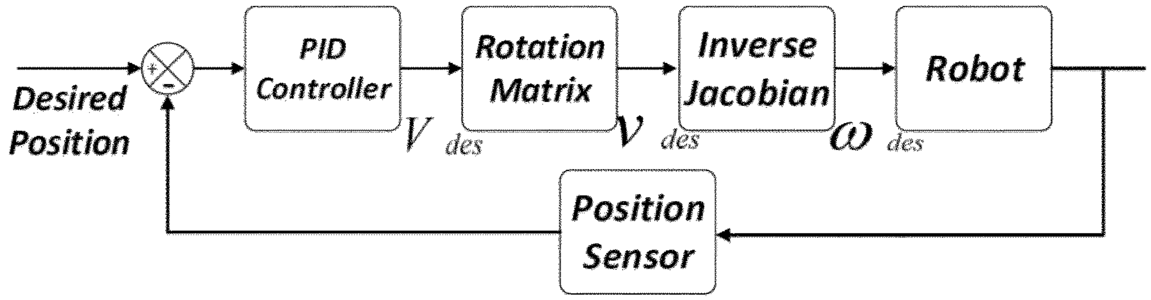
FIG. 35 shows a schematic of a PID control loop used for trajectory control of the mobile base.

As needed in initial stages of therapy, the robot can be controlled in position modes. The commonly used position control loop is a closed PID control loop as shown in FIG. 35. Here a desired global position will be the input of the control loop. The error between the desired and actual position will be sent to a well-tuned PID controller which the output will be transferred to the velocity of the robot in the local coordinate system using the rotation matrix. Using the Jacobian Calculated in Eq. 8, the desired rotational velocity of the wheels will be calculated. By knowing the PTR, the desired velocity to the EPOS drivers will be sent using UDP protocol through the Ethernet cable to the robot.

Orientation of Dome-Wheel or Cable-Winch Modules.

Figure 36:
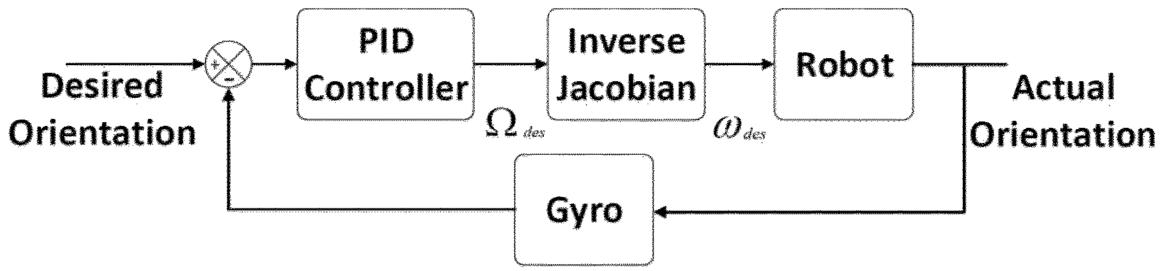
FIG. 36 shows a schematic of a PID control loop used for trajectory control of the orientation of the end-effector.

To evaluate the performance of the dome-wheel or cable-winch modules in generating a desired motion, first, a trajectory controller was developed in MATLAB/Simulink which uses the orientation feedback obtained from the gyro sensor. A schematic of the implemented control loop is shown in FIG. 36. As can be seen, after applying a PID controller, a velocity-based control signal is calculated which is then used to generate the desired angular velocity of the motors utilizing the robot's inverse Jacobian. The control loop implemented in this example shows the performance of the robot in providing the desired motion and safety feature corresponding to the adjustable transferred force.

Interaction Force Control of the Dome-Wheel or Cable-Winch Modules.

Figure 37:
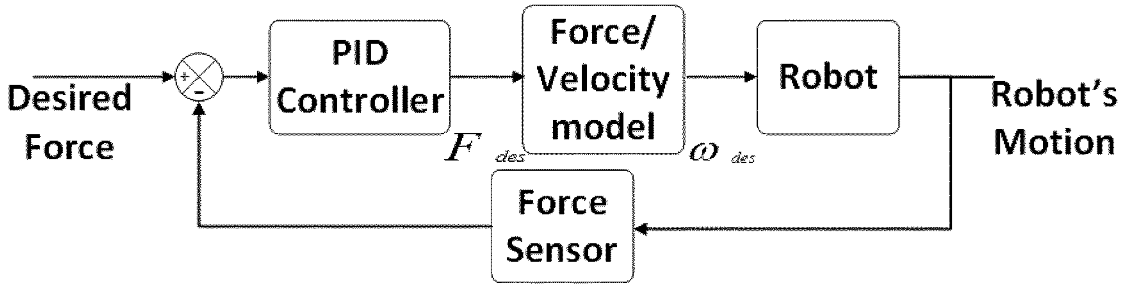
FIG. 37 shows a schematic of a PID control loop used to control interaction force with the user.

To control the interaction force between the robot and the patient's limb, a PID controller has been designed and implemented in MATLAB/Simulink. A schematic of the implemented control loop is shown in FIG. 37. This controller uses the interaction force measured by the force sensor (OptoForce) as the feedback. The difference between the desired value and the measured feedback is used to calculate the desired velocity that is commanded to the robot. In this controller, the output of the PID block is fed to the Force/Velocity model of the system. This model calculates the proper command to the robot (in velocity format) to achieve the desired force.

While several aspects of computer control of the rehabilitation device have been described in the context of robotic implementation, still further controller components and algorithms may be substituted, or added as desired to suit a particular implementation. The rehabilitation device accommodates many different types of controller components and control algorithms.

The rehabilitation device may accommodate various controller types and controller algorithms to provide a desired motion for therapy or training. For example, proportional-integrative-derivative (PID), proportional-integrative (PI) or proportional (P) algorithms may be used to control the rehabilitation device depending on parameters of a specific implementation. Still further algorithms are conventionally available.

While specific controller components have been described herein to illustrate robotic implementation, various other component architecture schemes are feasible. The computer control of the rehabilitation device typically requires a memory, an interface and a processor. The types and arrangements of memory, interface and processor may be varied according to implementations. For example, the interface may include a software interface that communicates with an end-user computing device. The interface may also include a physical electronic device configured to receive requests or queries from an end-user.

Although a Raspberry controller has been described in the examples above, other controllers such as a microprocessor or microcontroller may also be used. Many other computer device types may also be used as suited to a specific implementation, including for example, a programmable logic controller or a field programmable logic/gate array. Moreover, any conventional computer architecture may be used for computer-implemented control of the rehabilitation device including for example a memory, a mass storage device, a processor (CPU), a Read-Only Memory (ROM), and a Random-Access Memory (RAM) generally connected to a system bus of data-processing apparatus. Memory can be implemented as a ROM, RAM, a combination thereof, or simply a general memory unit. Software modules in the form of routines and/or subroutines for carrying out features of the rehabilitation device for maintaining a desired localization, a desired orientation, and/or a desired contact-force can be stored within memory and then retrieved and processed via processor to perform a particular task or function. Similarly, one or more compensation algorithms may be encoded as a program component, stored as executable instructions within memory and then retrieved and processed via a processor. A user input device, such as a keyboard, mouse, or another pointing device, can be connected to PCI (Peripheral Component Interconnect) bus. The software will typically provide an environment that represents programs, files, options, and so forth by means of graphically displayed icons, menus, and dialog boxes on a computer monitor screen.

A data-process apparatus can include CPU, ROM, and RAM, which are also coupled to a PCI (Peripheral Component Interconnect) local bus of data-processing apparatus through PCI Host Bridge. The PCI Host Bridge can provide a low latency path through which processor may directly access PCI devices mapped anywhere within bus memory and/or input/output (I/O) address spaces. PCI Host Bridge can also provide a high bandwidth path for allowing PCI devices to directly access RAM.

A communications adapter, a small computer system interface (SCSI), and an expansion bus-bridge may also be attached to PCI local bus. The communications adapter can be utilized for connecting data-processing apparatus to a network. SCSI can be utilized to control a high-speed SCSI disk drive. An expansion bus-bridge, such as a PCI-to-ISA bus bridge, may be utilized for coupling ISA bus to PCI local bus. PCI local bus can be connected to a monitor, which functions as a display (e.g., a video monitor) for displaying data and information for an operator and also for interactively displaying a graphical user interface.

Computer-implemented control of the rehabilitation device may accommodate any type of end-user computing device including computing devices communicating over a networked connection. The computing device may display graphical interface elements for performing the various functions of the system such as selecting a pre-set desired contact force, selecting a mobile base path or mode, selecting a control algorithm, modifying an existing contact-force setting or an existing control algorithm, or updating a database of an activity log that may be locally stored in the computing device. For example, the computing device may be a desktop, laptop, notebook, tablet, personal digital assistant (PDA), PDA phone or smartphone, gaming console, portable media player, and the like. The computing device may be implemented using any appropriate combination of hardware and/or software configured for wired and/or wireless communication. Communication can occur over a network, for example, where remote control or remote monitoring of the rehabilitation device is desired.

If a networked connection is desired the rehabilitation device and its controlling system may accommodate any type of network. The network may be a single network or a combination of multiple networks. For example, the network may include the internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet. For example, the network may comprise a computer network that makes use of a TCP/IP protocol (including protocols based on TCP/IP protocol, such as HTTP, HTTPS or FTP).

The rehabilitation device and systems incorporating the same as described herein and each variant, modification or combination thereof may be controlled by a suitable computer-implemented method. A method of controlling the rehabilitation device includes detecting force, localization of the mobile base module, or orientation of the dome-wheel or cable-winch modules data with a corresponding one or more sensors; receiving the sensor-detected real-time data with a controller; and generating and communicating a control signal to an appropriate actuator to minimize a difference between the real-time data and a preset desired value.

The rehabilitation device and systems incorporating the same as described herein and each variant, modification or combination thereof may also be implemented as a method or computer programmable/readable code on a non-transitory computer readable medium (i.e. a substrate). The computer readable medium is a data storage device that can store data, which can thereafter, be read by a computer system. Examples of a computer readable medium include read-only memory, random-access memory, CD-ROMs, magnetic tape, SD card, optical data storage devices and the like. The computer readable medium may be geographically localized or may be distributed over a network coupled computer system so that the computer readable code is stored and executed in a distributed fashion.

Embodiments described herein are intended for illustrative purposes without any intended loss of generality. Still further variants, modifications and combinations thereof are contemplated and will be recognized by the person of skill in the art. Accordingly, the foregoing detailed description is not intended to limit scope, applicability, or configuration of claimed subject matter.

What is claimed is:

1. A motorized rehabilitation device comprising:

a mobile base bound by a lower surface and an upper surface, wherein the mobile base comprises a motorized wheel assembly at least partially extending below the lower surface of the base;

a motorized cable-winch assembly supported on the upper surface of the mobile base;

a central rod extending from the upper surface of the base, a rotational joint connecting a first end of the central rod to the base; a dome connected to the central rod; and an end-effector positioned at a second end of the central rod, the end-effector configured to engage an animal body part.

2. The device of claim 1, wherein the motorized wheel assembly comprises at least 3 wheels, each wheel driven by a motor, and each motor is slidable from a first position providing a first power transmission to a second position providing a second power transmission.

3. The device of claim 2, wherein the first power transmission is a first set of gears operably communicative between the motor in the first position and the wheel and the second power transmission is a second set of gears operably communicative between the motor in the second position and the wheel.

4. The device of claim 2, wherein the first power transmission is configured for an upper extremity therapy and the second power transmission is configured for a lower extremity therapy, the second power transmission transmitting greater power to the wheel than the first power transmission.

5. The device of claim 1, wherein the motorized cable-winch assembly comprises at least 3 motorized cable-winch units, a cable from each unit connected to the central rod, and each motor of the at least 3 motorized cable-winch units is slidable from a first position providing a first power transmission to a second position providing a second power transmission.

6. The device of claim 5, wherein the first power transmission is a first set of gears operably communicative between the motor in the first position and the cable and the second power transmission is a second set of gears operably communicative between the motor in the second position and the cable.

7. The device of claim 5, wherein the first power transmission is configured for an upper extremity therapy and the second power transmission is configured for a lower extremity therapy, the second power transmission transmitting greater power to the cable than the first power transmission.

8. The device of claim 5, further comprising a clutch operably communicative with a motor and a winch drum in each of the at least 3 motorized cable-winch units.

9. The device of claim 8, wherein the clutch is a friction clutch.

10. A robotic rehabilitation system comprising:

the device of claim 1;

a localization sensor connected to the mobile base, the localization sensor detecting real-time location data;

a controller for receiving the real-time localization data and for generating and communicating a control signal to the mobile base to minimize a difference between the real-time location data and a preset desired location.

11. The device of claim 2, wherein an axis of each wheel is aligned substantially parallel to a radial direction of the base.

12. The device of claim 2, wherein each wheel is an omni-wheel.

13. The device of claim 5, wherein an axis of a winch drum in each of the at least 3 motorized cable-winch units is aligned substantially perpendicular to a radial direction of the base.

14. The device of claim 1, wherein the rotational joint is a universal joint.

15. The device of claim 1, further comprising a force sensor operably communicative with the end-effector, the force sensor mounted between the end-effector and the second end of the central rod.

16. The device of claim 1, further comprising a plurality of localization sensors mounted to the lower surface of the base.

17. The device of claim 1, further comprising a plurality of stabilizing arms pivotably coupled to the base, the plurality of stabilizing arms extendable from a first position circumferentially proximal to a perimeter of the base to a second position circumferentially distal from the perimeter of the base.

18. The device of claim 17, further comprising a spherical wheel mounted at a free end of each of the plurality of stabilizing arms.

19. A robotic rehabilitation system comprising:

the device of claim 1;

a force sensor connected to the end-effector, the force sensor detecting real-time contact force data;

a controller for receiving the real-time contact force data and for generating and communicating a control signal to the motorized cable-winch assembly to minimize a difference between the real-time contact force data and a preset desired contact force.

20. A robotic rehabilitation system comprising:

the device of claim 1;

an orientation sensor operably communicative with central rod motion, the orientation sensor detecting real-time rod-orientation data;

a controller for receiving the real-time rod-orientation data and for generating and communicating a control signal to the motorized cable-winch assembly to minimize a difference between the real-time rod-orientation data and a desired rod-orientation.

21. The device of claim 1, wherein a shape of the dome is hemispherical, ellipsoidal, pyramidal, plateaued pyramidal, or geodesic.

* * * * *